United States Patent
Kumar et al.

(10) Patent No.: US 8,768,743 B2
(45) Date of Patent: Jul. 1, 2014

(54) PRODUCT SPACE BROWSER

(75) Inventors: Shailesh Kumar, San Diego, CA (US); Stuart Crawford, Piedmont, CA (US); Sergei Tolmanov, Walnut Creek, CA (US); Megan Thorsen, Sunnyvale, CA (US); Helen Geraldine E Rosario, Austin, TX (US); Ashutosh Joshi, San Diego, CA (US); Victor Miagkikh, San Francisco, CA (US); Colin Little, Emeryville, CA (US)

(73) Assignee: Fair Isaac Corporation, San Jose, CA (US)

( * ) Notice: Subject to any disclaimer, the term of this patent is extended or adjusted under 35 U.S.C. 154(b) by 2101 days.

(21) Appl. No.: 11/625,247

(22) Filed: Jan. 19, 2007

(65) Prior Publication Data

US 2007/0118439 A1    May 24, 2007

Related U.S. Application Data

(63) Continuation-in-part of application No. 11/256,386, filed on Oct. 21, 2005, now Pat. No. 7,672,865.

(60) Provisional application No. 60/803,814, filed on Jun. 2, 2006, provisional application No. 60/813,546, filed on Jun. 13, 2006.

(51) Int. Cl.
G06F 17/30    (2006.01)

(52) U.S. Cl.
USPC .......................................................... 705/7.29

(58) Field of Classification Search
CPC ...................................................... G06Q 10/00
USPC .......................................................... 705/7.29
See application file for complete search history.

(56) References Cited

U.S. PATENT DOCUMENTS

| 7,630,986 B1 * | 12/2009 | Herz et al. | 1/1 |
| 2004/0031058 A1 * | 2/2004 | Reisman | 725/112 |

OTHER PUBLICATIONS

Montqomery, Applying quantitative marketing techniques to the Internet, Interfaces. Linthicum, Apr. 2001. vol. 31, Iss. 2; p. 90, ProQuest , pp. 1-18.*

* cited by examiner

*Primary Examiner* — Romain Jeanty
(74) *Attorney, Agent, or Firm* — Mintz Levin Cohn Ferris Glovsky and Popeo, P.C.

(57) ABSTRACT

A product space browser (PSB), which comprises a graphical user interface (GUI) that facilitates insight discovery through exploration and analysis of product space graphs generated by applying a product affinity engine to retailer's transaction data in a market basket context, is disclosed.

41 Claims, 48 Drawing Sheets

| PeaCoCk Product Index | | | | | |
|---|---|---|---|---|---|
| Level: CLASS ▼ | | Showing All 10 Nodes | | | |
| Index | Code | Name | Revenue.Total | Margin.Total | Frequency.Line |
| 25 | 2-3 | CLASS_25 | $136,276,640.00 | $28,210,616.00 | 74,965 |
| 27 | 3-1 | CLASS_27 | $89,677,080.00 | $28,959,970.00 | 1,240,469 |
| 38 | 4-1 | CLASS_38 | $247,506,080.00 | $51,777,968.00 | 535,427 |
| 57 | 5-6 | CLASS_57 | $212,190,336.00 | $33,019,140.00 | 606,366 |
| 70 | 6-1 | CLASS_70 | $21,324,490.00 | $16,670,716.00 | 698,860 |
| 73 | 6-4 | CLASS_73 | $328,711,200.00 | $17,447,584.00 | 446,869 |

Retailor Code

Property Names

Modify Columns

FIG. 9

| Level: CLASS ▼ | | Showing All 10 Nodes | | | Modify Columns |
|---|---|---|---|---|---|
| Index | Code | Name | Revenue Total | Margin. Total | Frequency.Line |
| 25 | 2-3 | CLASS_25 | $136,276,640.00 | $28,210,616.00 | 74,965 |
| 27 | 3-1 | CLASS_27 | $89,677,080.00 | $28,959,970.00 | 1,240,469 |
| 38 | 4-1 | CLASS_38 | $247,506,080.00 | $51,777,968.00 | 535,427 |
| 57 | 5-6 | CLASS_57 | $212,190,336.00 | $33,019,140.00 | 606,366 |
| 70 | 6-1 | CLASS | Display Subgraph | $16,670,716.00 | 698,860 |
| 73 | 6-4 | CLASS | Display Children Subgraph | $17,447,584.00 | 446,869 |
| 80 | 6-11 | CLASS | Display Neighborhood | $30,710,382.00 | 306,718 |
| 88 | 6-19 | CLASS | Display Bundles | $14,645,911.00 | 408,528 |
| 115 | 9-5 | CLASS | Display Bridges | $3,317,691.00 | 541,814 |
| 147 | 11-5 | CLASS | Select All  Invert Selection | $6,048,267.00 | 235,343 |
| | | | Copy | | |

FIG. 18

| Level: | CLASS | ▶ | Showing All 10 Nodes | | | Modify Columns |
|---|---|---|---|---|---|---|
| Index | | Name | Revenue Total | Margin Total | Frequency.Line | |
| 25 | 2-3 | CLASS_25 | $136,276,640.00 | $28,210,616.00 | 74,965 | |
| 27 | 3-1 | CLASS_27 | $89,677,080.00 | $28,959,970.00 | 1,240,469 | |
| 38 | 4-1 | CLASS_38 | $247,506,080.00 | $51,777,968.00 | 535,427 | |
| 57 | 5-6 | CLASS_57 | $212,190,336.00 | $33,019,140.00 | 606,366 | |
| 70 | 6-1 | CLASS | Display Subgraph | $16,670,716.00 | 698,860 | |
| 73 | 6-4 | CLASS | Display Children Subgraph | $17,447,584.00 | 446,869 | |
| 80 | 6-11 | CLASS | Select All | $30,710,382.00 | 306,718 | |
| 88 | 6-19 | CLASS | Invert Selection | $14,645,911.00 | 408,528 | |
| 115 | 9-5 | CLASS | Copy | $3,317,691.00 | 541,814 | |
| 147 | 11-5 | CLASS_147 | | $6,048,267.00 | 235,343 | |

FIG. 19

PRODUCT SPACE BROWSER

CROSS REFERENCE TO RELATED APPLICATIONS

This application claims priority to provisional U.S. patent applications Ser. Nos. 60/813,546, dated Jun. 13, 2006 and 60/803,814, dated Jun. 2, 2006, and is a continuation-in-part of U.S. patent application Ser. No. 11/256,386, filed Oct. 21, 2005, now U.S. Pat. No. 7,672,865, each of which is incorporated herein in its entirety by this reference thereto.

BACKGROUND OF THE INVENTION

1. Technical Field

The invention relates to customer purchase behavior. More particularly, the invention relates to a product space browser.

2. Description of the Prior Art

Retail leaders recognize today that the greatest opportunity for innovation lies at the interface between the store and the customer. The retailer owns vital marketing information on the purchases of millions of customers: information that can be used to transform the store from a fancy warehouse where the customer is a mere stock picker into a destination where customers go because of the value the store gives them. The opportunity is enormous: seventy to eighty percent of buying choices are made at the point of purchase, and smart retailers can influence the choices to maximize economic value and customer satisfaction. Because the retailer is closest to the consumer, he has the unique opportunity and power to create loyalty, encourage repeat purchase behavior and establish high value purchase career paths. However, to optimize the customer interface in this fashion, retailers must be extremely sophisticated with analysis of their purchase data. The sheer volume of purchase data, while offering unprecedented opportunities for such customer centric retailing, also challenges the traditional statistical and mathematical techniques at the retailer's disposal. Retail data analysts frequently find it difficult, if not impossible, to derive concrete, actionable decisions from such data. Most traditional retailers use only limited OLAP capabilities to slice and dice the transaction data to extract basic statistical reports and use them and other domain knowledge to make marketing decisions. Only in the last few years have traditional retailers started warming up to segmentation, product affinity analysis, and recommendation engine technologies to make business decisions. Traditional computational frameworks, such as classification and regression, seek optimal mappings between a set of input features that either cause or correlate-with a target variable. It would be advantageous to provide improved approaches to retail data mining.

A Model of the Retail Behavior of Customers

Customer purchase behavior may be characterized as a mixture of projections of time-elapsed latent purchase intentions. A customer purchases a particular product at a certain time in a certain store with a certain intention, e.g. weekly grocery, back-to-school, etc. An intention is latent, i.e. it is not obvious or announced, although it may be deduced from the context of the products purchased. Each visit by a customer to the store may reflect one or more (mixture of) intentions. Each intention may involve purchase of one or more products. For a multi-product intention, it is possible that the customer may not purchase all the products associated with that intention either at the same store or in the same visit. The transaction data only reflects a subset or a projection of a latent intention for several reasons, for example, maybe the customer already has some of the other products associated with the intention, or he received them as a gift, or he purchased them at a different store, etc. Finally, an intention may be spread across time. For example, certain intentions, such as kitchen remodeling or setting up a home office, may take several weeks and multiple visits to different stores.

A Model of Retail Transaction Data

Retail transaction data may be characterized as a time-stamped sequence of market baskets. The key characteristics of such a transaction data are:

- Noisy—both intentional and impulsive purchases;
- Incomplete—only projections of intentions present;
- Overlapping—mixture of intentions in the same visit;
- Indirect—purchase drivers or customer intentions are latent;
- Unstructured—customers have different length time histories; and
- Time-component—patterns in the data elapse along time.

These characteristics pose challenges in discovering consistent and significant patterns of purchase behavior from transaction data that may be used for making precise, timely, and profitable decisions by retailers.

SUMMARY OF THE INVENTION

The invention provides a product space browser (PSB), which comprises a graphical user interface (GUI) that facilitates insight discovery through exploration and analysis of product space graphs generated by applying a product affinity engine to a retailer's transaction data in a market basket context.

BRIEF DESCRIPTION OF THE DRAWINGS

FIG. 9 is a screen shot of the product space browser GUI providing a spreadsheet view of properties for the property panel according to the invention;

FIG. 18 is a screen shot showing product space browser functionality and, in particular, a single selection through this property panel according to the invention;

FIG. 19 is a screen shot showing product space browser functionality and, in particular, multiple selection through the property panel.

DETAILED DESCRIPTION OF THE INVENTION

Figure 1:
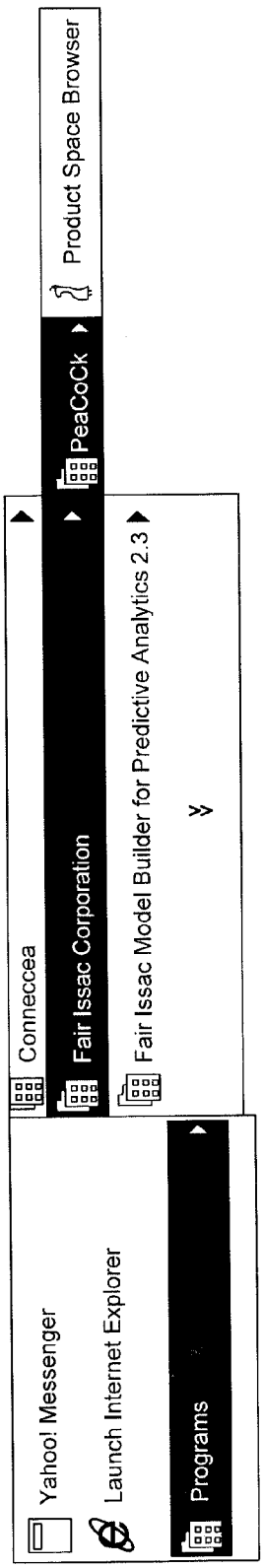
FIG. 1 is a screen shot showing an exemplary product space browser during launch according to the invention.

The invention provides a product space browser (PSB), which comprises a graphical user interface (GUI) that facilitates insight discovery through exploration and analysis of product space graphs generated by applying a product affinity engine to retailer's transaction data in a market basket context. For purposes of the discussion herein, a product space graph is an internal representation of co-purchase consistency relationships between all pairs of products, at various product resolutions, computed from a retailer's transaction data. Further, for purposes of the discussion herein, the product affinity engine may comprise the Peacock engine offered by Fair Isaac Corp. Those skilled in the art will recognize that other retail data mining engines may be substituted for the Peacock engine.

Peacock

The Pair-wise Co-occurrence Consistency Co-occurrence (PeaCoCk) framework (see U.S. patent application Ser. No. 11/256,386, filed Oct. 21, 2005, which is incorporated herein in its entirety by this reference thereto) seeks patterns of interest in pair-wise relationships between entities. Such a framework may be applied in a wide variety of domains with unstructured or hyper-structured data, for example in language understanding and text mining (syntactic and semantic relationships between words, phrases, named entities, sentences, and documents), bioinformatics (structural, functional, and co-occurrence relationships between nucleotides in gene sequences, proteins in amino acid sequences, and genes in gene expression experiments), image understanding and computer vision (spatial co-occurrence relationships of pixels, edges, and objects in images), transaction data analytics (consistent co-occurrence relationships between events), and retail data analytics (co-occurrence consistency relationships between products and similarity relationships between customers). In the preferred embodiment of the invention disclosed herein, the PeaCoCk framework is applied to Retail Data Mining, i.e. finding insights and creating decisions from retail transaction data that is being collected by almost all large retailers for over a decade.

The invention provides a method and apparatus for visualizing data that, in conjunction with a retail data mining engine, such as PeaCoCk, discovers consistent relationships in massive amounts of purchase data, bringing forth product relationships based on purchase-behavior, both in market baskets and across time. It helps retailers identify opportunities for creating an efficient alignment of customer intent and store content using purchase data. This helps customers find the products they want, and be offered the products they need. It helps segment customers and products based on purchase behavior to create a differentiated customer experience and generate recommendations tailored to each customer and each store. It helps retailers analyze purchase career paths that lend themselves to generating accurate cross-sell and up-sell recommendations and targeted promotions. It helps determine bridge products that can influence future purchase sequences and help move a customer's purchase career path from one category to another higher value category. Finally, it can be used to generate valuable in-the-field analyses of product purchase affinities that retailers can offer for sale to manufacturers and distributors as information products.

Definition of a Product Space Graph

A product space graph constrains the scope of a product relationship (Customization), defines the nature of a product relationship (Context), and quantifies the strength of the product relationship (Consistency). These aspects of the product space graph are summarized as:

Customization—constraints the scope of product relationship:
  Customer customization—Segments, Value Tiers, etc.;
  Location customization—Stores, Regions, etc.; and
  Temporal customization—Week, month, quarter, season, etc.
Context—defines the nature of product relationship:
  Single visit Market Basket Context;
  Multi-visit Market Basket Context.
Consistency—quantifies the strength of product relationship:
  Degree to which two products are co-purchased relative to the random.

Launching the Product Space Browser (see FIG. 1)

Figure 2:
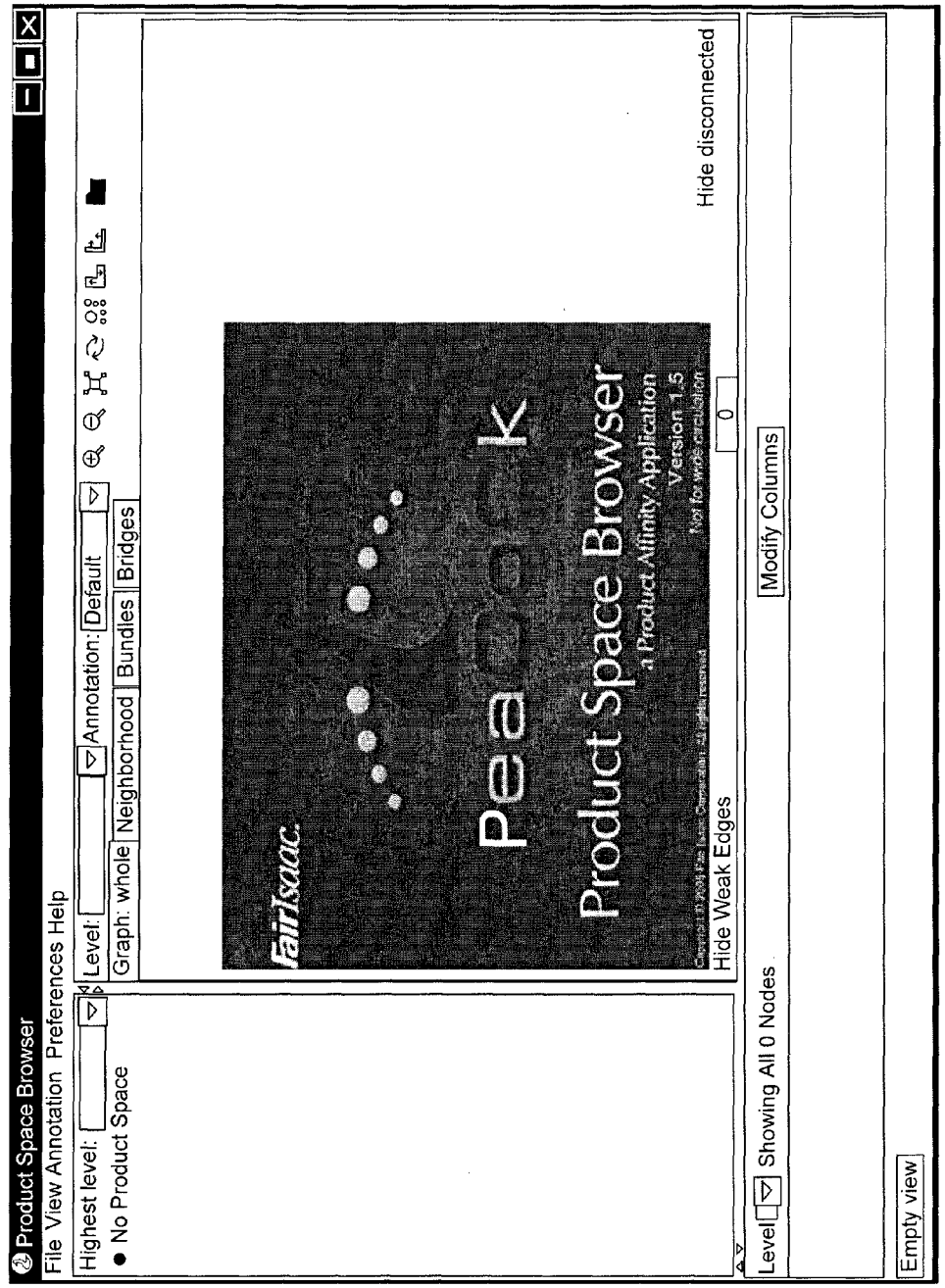
FIG. 2 is a screen shot showing a successful launch of the exemplary product space browser according to the invention.

FIG. 1 is a screen shot showing an exemplary product space browser during launch.
To Launch the Program:
Go to "Start" Menu->
All Programs->
Fair Isaac Corporation->
PeaCoCk->Product Space Browser FIG. 2 is a screen shot showing a successful launch of the exemplary product space browser.

Figure 3:
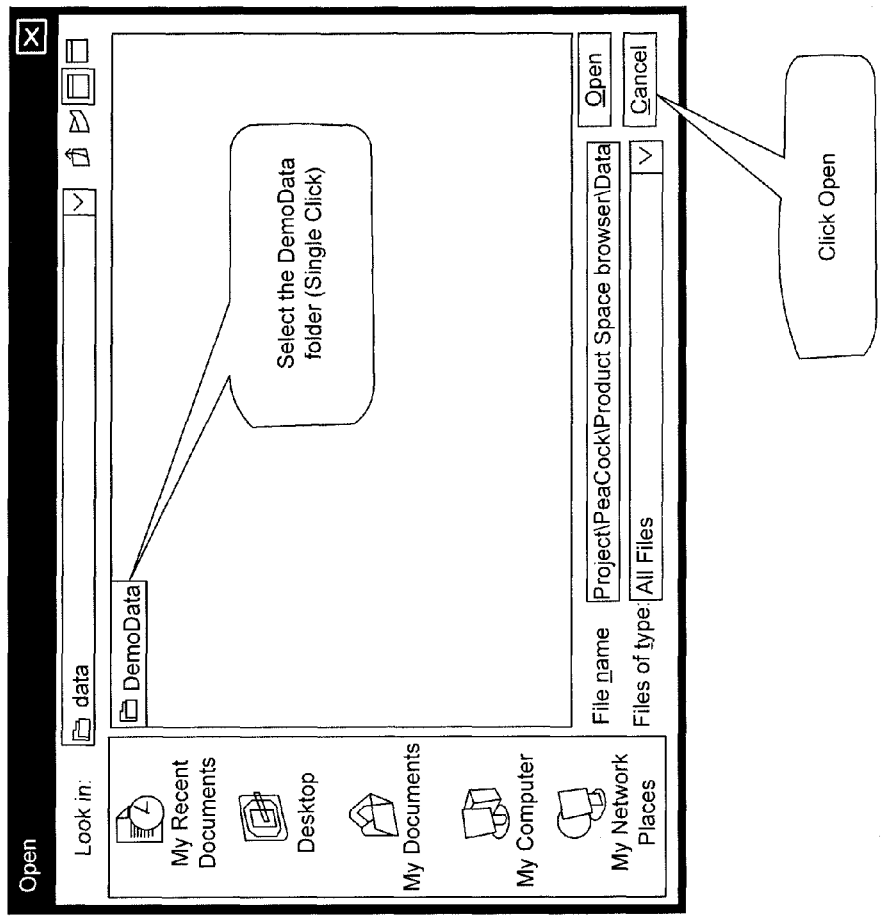
FIG. 3 is a screen shot showing the process of loading a product space into the product space browser according to the invention.
Figure 3:
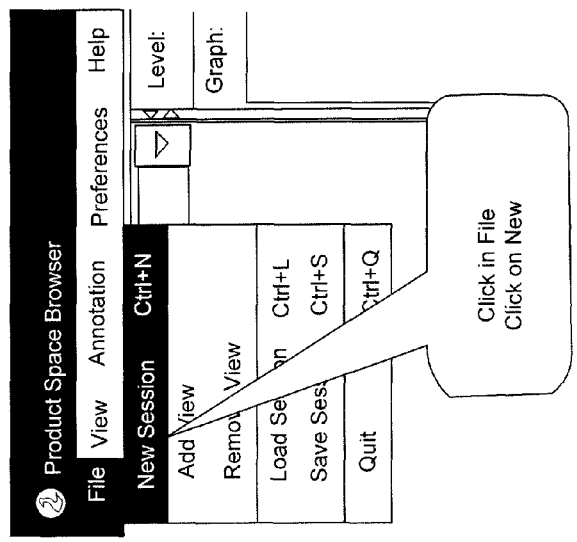
Figure 4:
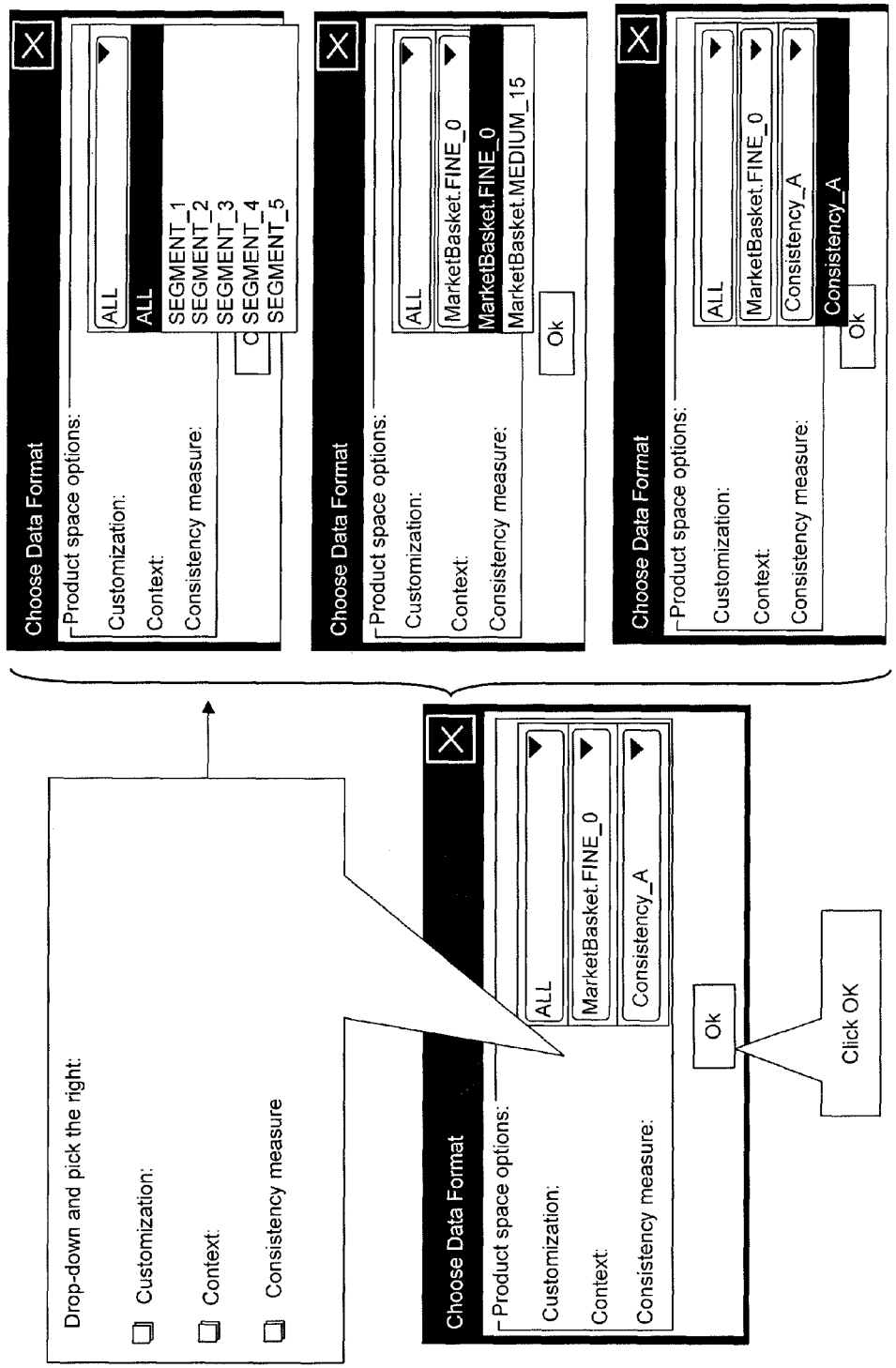
FIG. 4 is a screen shot showing the loading of the product space in connection with selection of a product space to browse according to the invention.

Loading the Product Space (see FIGS. 3 and 4)

FIG. 3 is a screen shot showing the process of loading a product space into the product space browser. The example of FIG. 3 shows the use of a demonstration data folder, although those skilled in the art will appreciate that, in practical application, the product space browser loads an actual data folder.

Step 1: Choose the Demo Data Folder (FIG. 3)

At Step 1 in the procedure, the user chooses the appropriate data folder, which, in this case, is a demonstration data folder. The user clicks on the File pull-down and then selects New Session. The user selects the appropriate folder, which, in this case, is the DemoData, and then clicks the Open button.

Step 2: Choose the Product Space to Browse (FIG. 4)

FIG. 4 is a screen shot showing the loading of the product space in connection with selection of a product space to browse. In the example shown in FIG. 4, a drop-down menu appears that allows the user to select customization, context, and a consistency measure. In FIG. 4, the user selects all customizations, the context selected is MarketBasket.Fine_0, and the consistency measure is consistency_A. Once the user has selected the parameters for the data format, the user clicks Okay and proceeds to browse the product space.

Understanding the PSB GUI (FIGS. 5-15)

Figure 5:
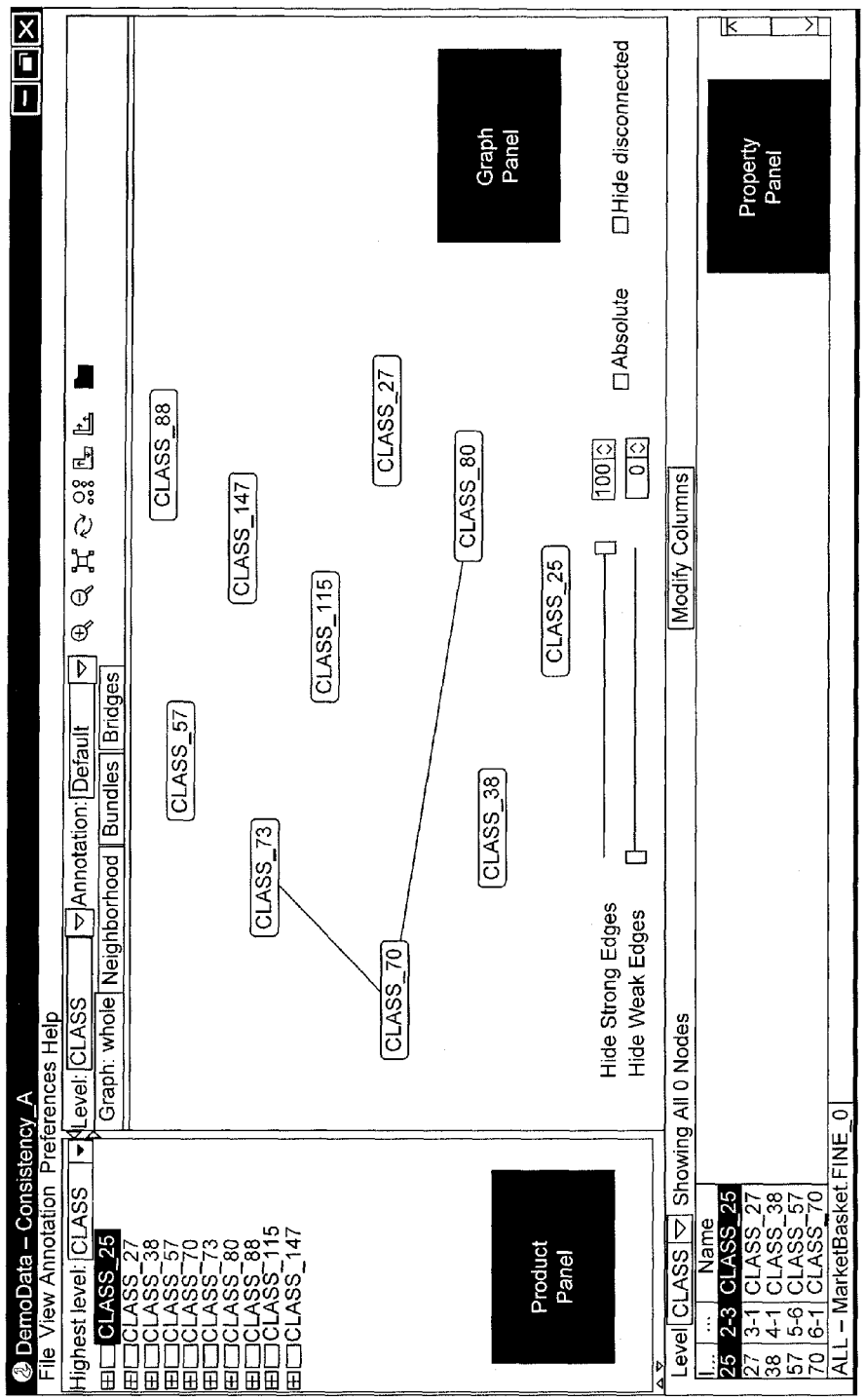
FIG. 5 is a screen shot showing the graphic user interface (GUI) for the product space browser according to the invention.

The Three Panels—Product, Property, Graph (FIG. 5)

FIG. 5 is a screen shot showing the graphic user interface (GUI) for the product space browser. The exemplary product space browser includes three panels, i.e., product, property, and graph. In FIG. 5, the product panel is shown on the left, the property panel is shown on the bottom, and the graph panel is shown in the center of the screen. In this example, the user has selected Class 25, the level of display is Class level, and default annotation is used. These concepts are explained in greater detail below. Further, the user has selected to graph the whole product Class level. The user may also graph the neighborhoods, bundles, or bridges, as explained in greater detail below.

Figure 6:
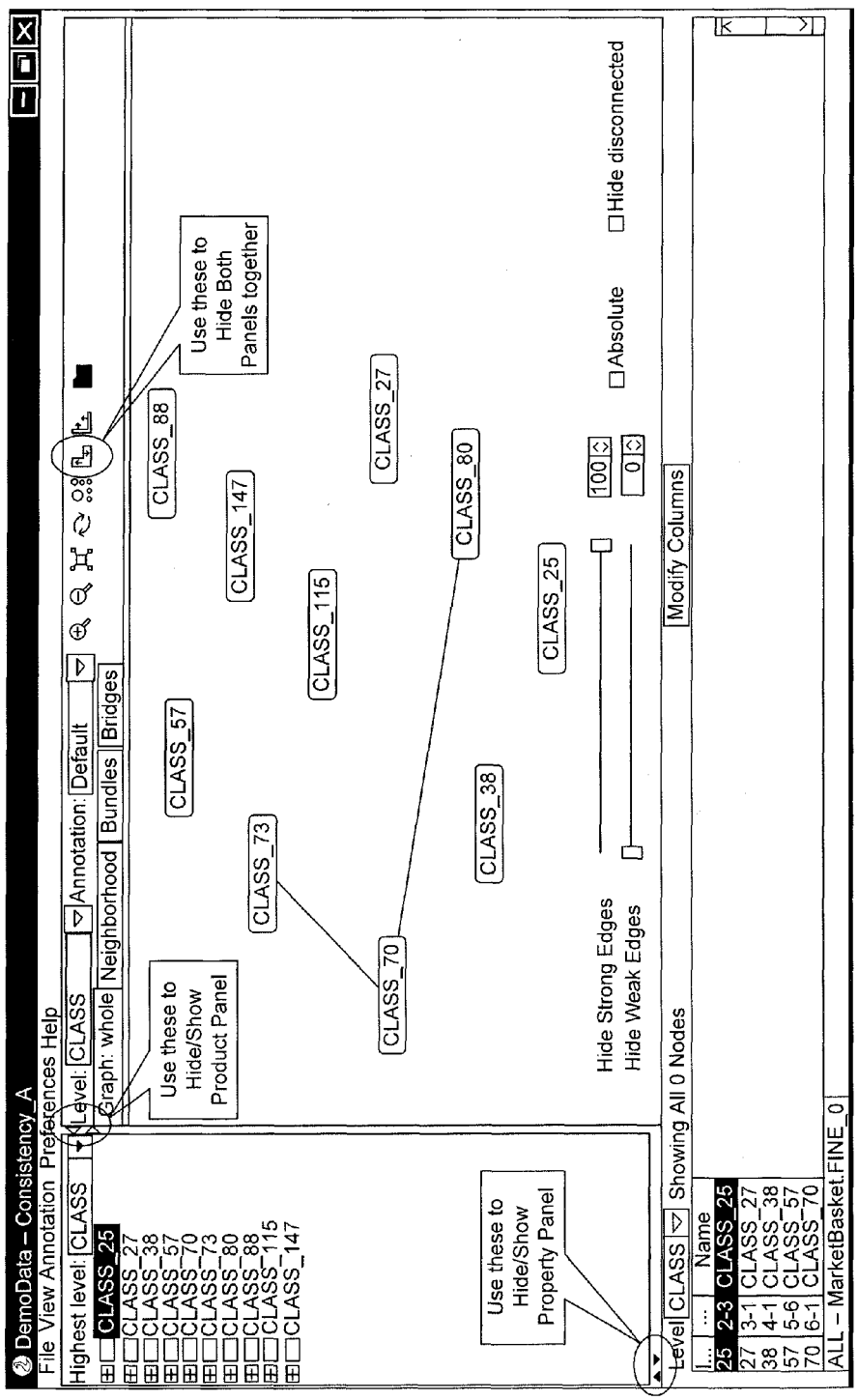
FIG. 6 is a screen shot showing the product space browser GUI, including a feature that allows hiding and showing of the property and product panel, according to the invention.

Hiding/Showing the Property and Product Panel (FIG. 6)

FIG. 6 is a screen shot showing the product space browser GUI, including a feature that allows hiding and showing of the property and product panel. In FIG. 6, buttons are provided to hide or show the product panel and the property panel, as noted on FIG. 6. Additionally, a button is provided by which the user may hide both the product and property panel at the same time, thus allowing the graph panel to be displayed in the entire display space.

The Product Panel

Figure 7:
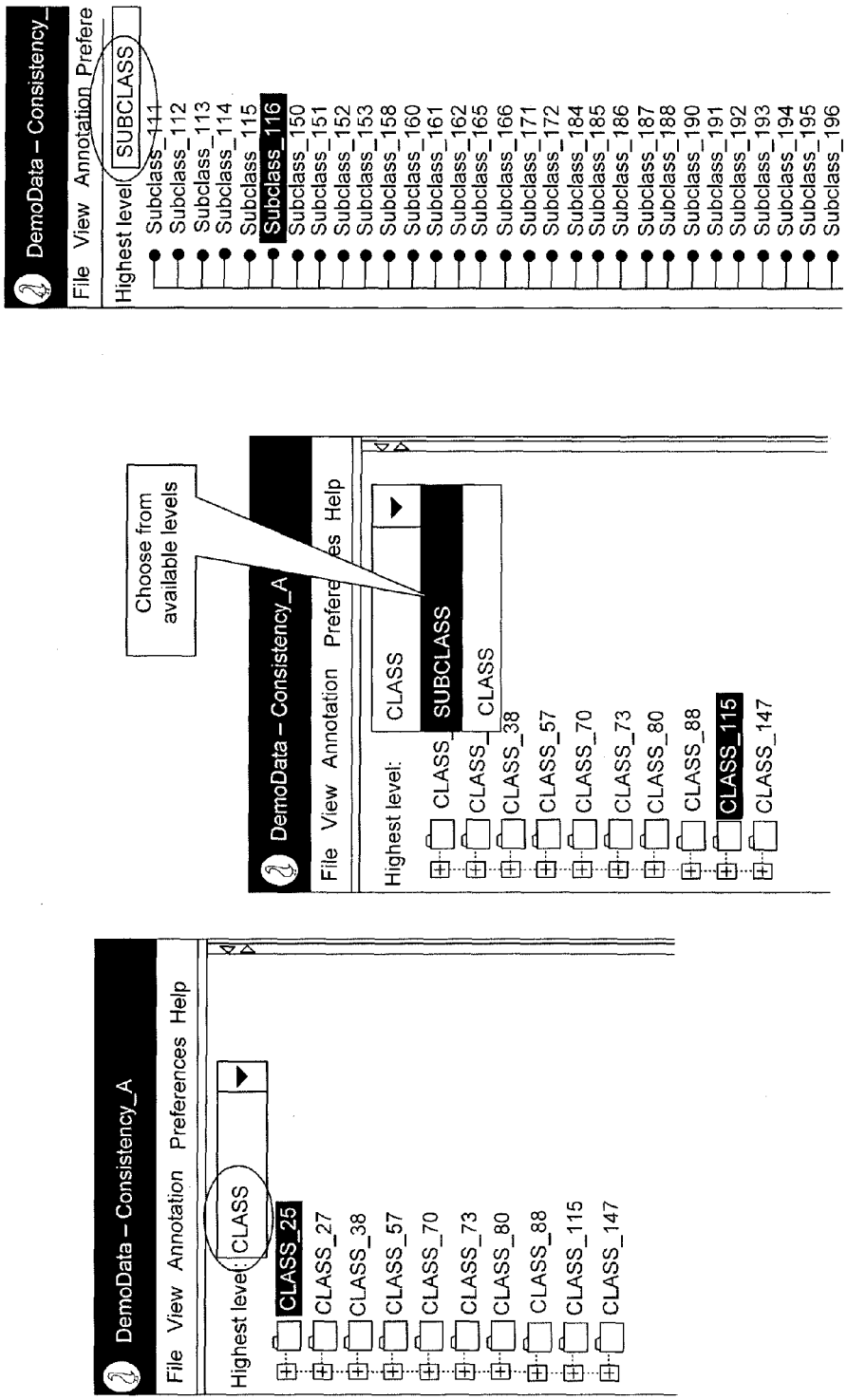
FIG. 7 is a screen shot of the product space browser GUI showing choosing of the product level according to the invention.

Choosing Product Level (FIG. 7)

FIG. 7 is a screen shot of the product space browser GUI showing choosing of the product level. In FIG. 7, the highest level is selected by the user, in this case Class. The user is able to choose from among the available levels, as further shown in FIG. 7. In this example, the user may choose SUB-CLASS. As a result, sub-classes for a particular class are listed. Thus, this aspect of the invention lists all products in the current level, where the default is the highest level available. The user is able to choose the level that the user is interested in to see a product list at that level.

Figure 8:
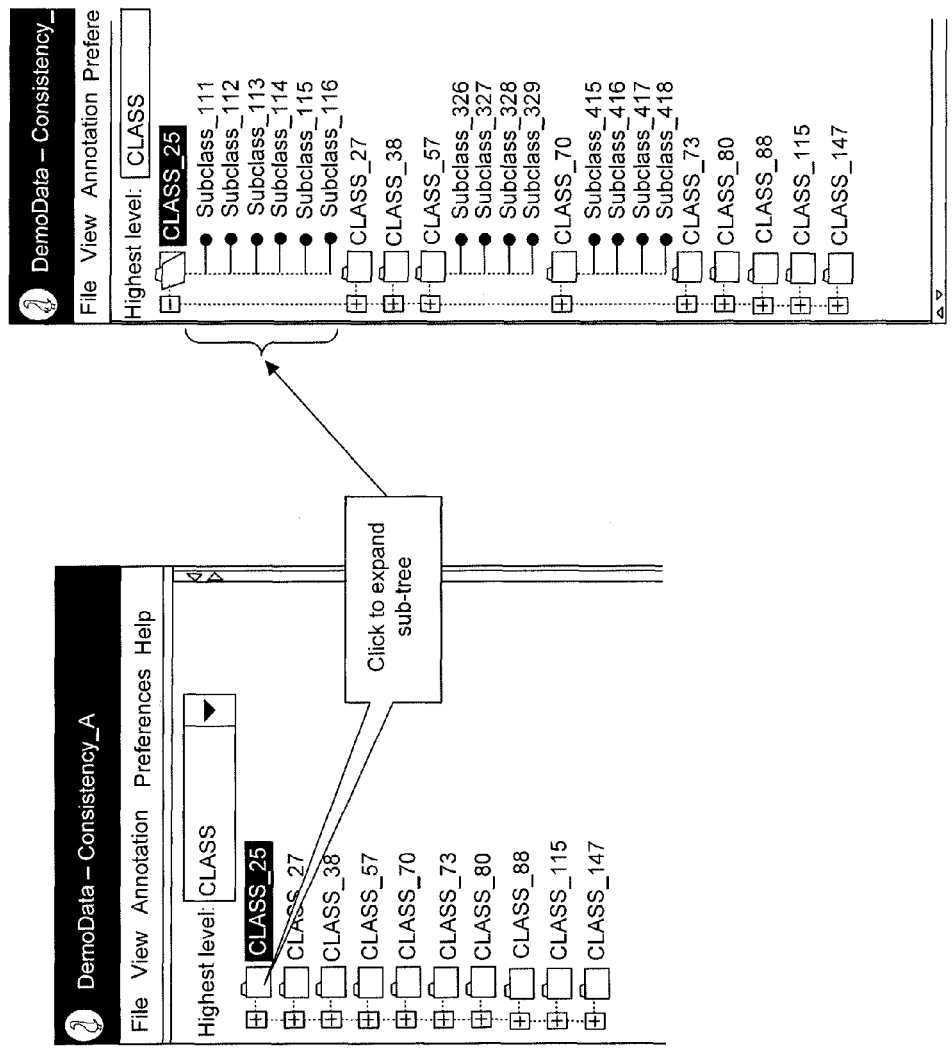
FIG. 8 is a screen shot of the product space browser GUI showing a product hierarchy view according to the invention.

Product Hierarchy View (FIG. 8)

FIG. 8 is a screen shot of the product space browser GUI showing a product hierarchy view. In FIG. 8, Class 25 is selected, the highest level being the Class level. The user may click the + symbol to expand the sub-tree. As can be seen in FIG. 8, the sub-tree of Class 25 is expanded to show the associated sub-classes.

The Property Panel

Spreadsheet View of Properties (FIG. 9)

FIG. 9 is a screen shot of the product space browser GUI providing a spreadsheet view of properties for the property panel. It should be noted in connection with the invention that columns can be resized, that columns can be dragged and moved around in different positions, that the entire table can be sorted by one or two properties, and that properties can be seen for any level. In the example of FIG. 9, a product index 25 is shown. Retailer codes, e.g., 6-4, are shown, and property names are shown, as well, such as Revenue.Total, Margin.Total, and Frequency.Line.

Figure 10:
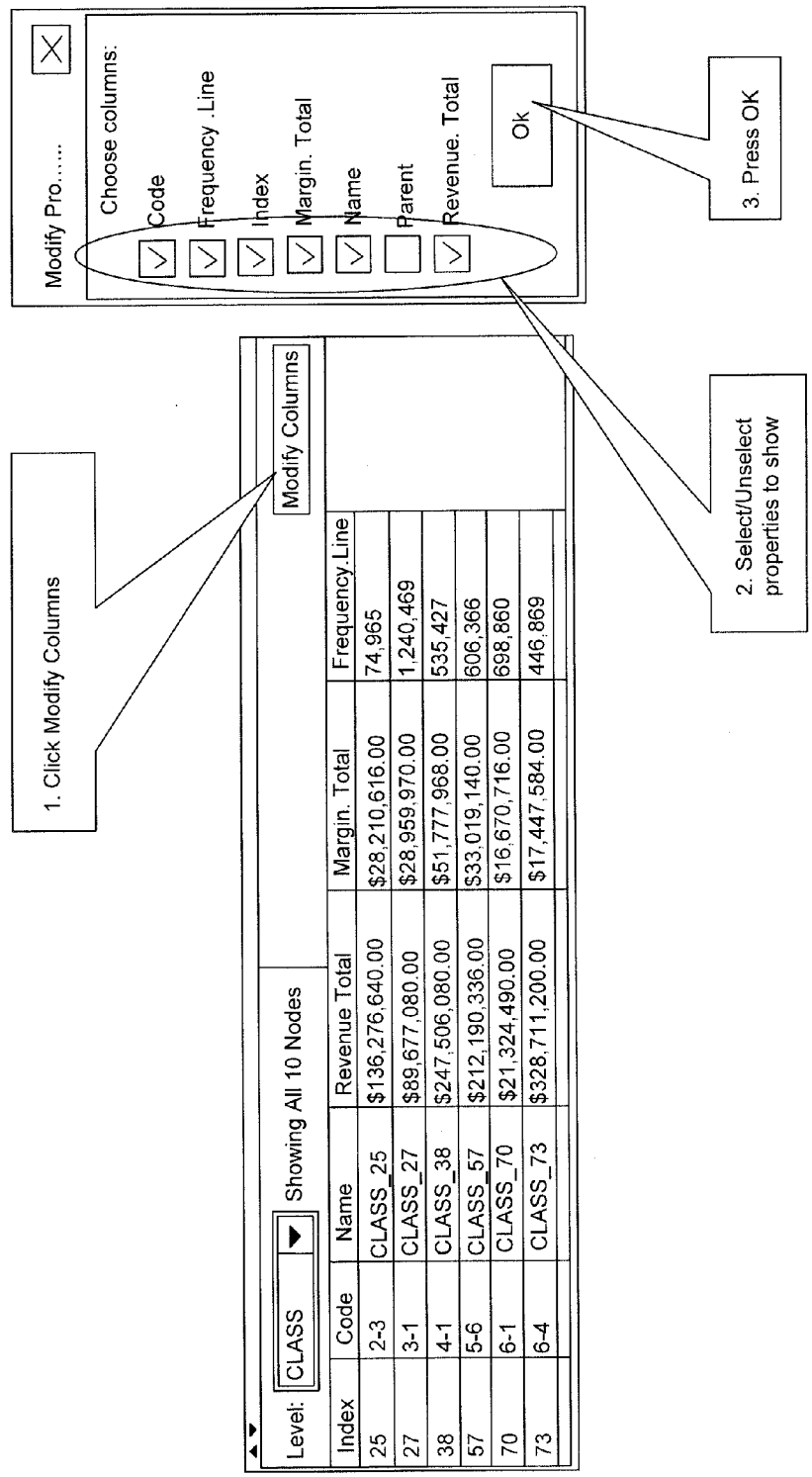
FIG. 10 is a screen shot of the product space browser GUI showing modification of the properties list in the property panel according to the invention.

Modifying Properties List (FIG. 10)

FIG. 10 is a screen shot of the product space browser GUI showing modification of the properties list in the property panel. In FIG. 10, a user may click the Modify Columns button and a popup shows the modification that may be made. To modify the columns, the user selects or unselects the properties from the properties list that are desired. The user then presses Okay to confirm this property list and the property panel displays properties in the selected manner.

The Graph Panel

Figure 11:
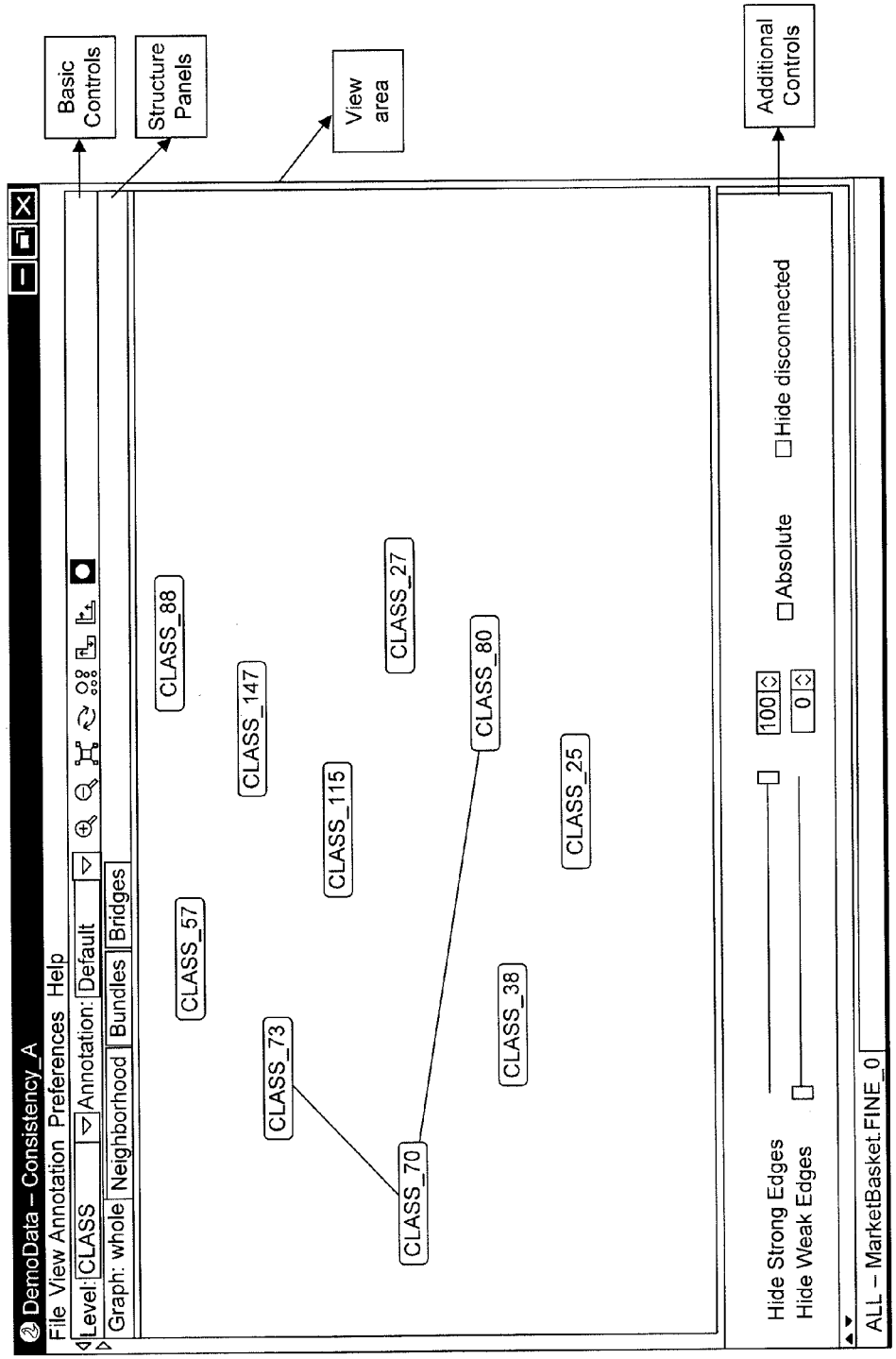
FIG. 11 is a screen shot of the product space browser GUI showing the graph panel and, in particular, the main graph viewer according to the invention.

The Main Graph Viewer (FIG. 11)

FIG. 11 is a screen shot of the product space browser GUI showing the graph panel and, in particular, the main graph viewer. The graph viewer includes basic controls, structure panels, a view area, and additional controls.

Figure 12:
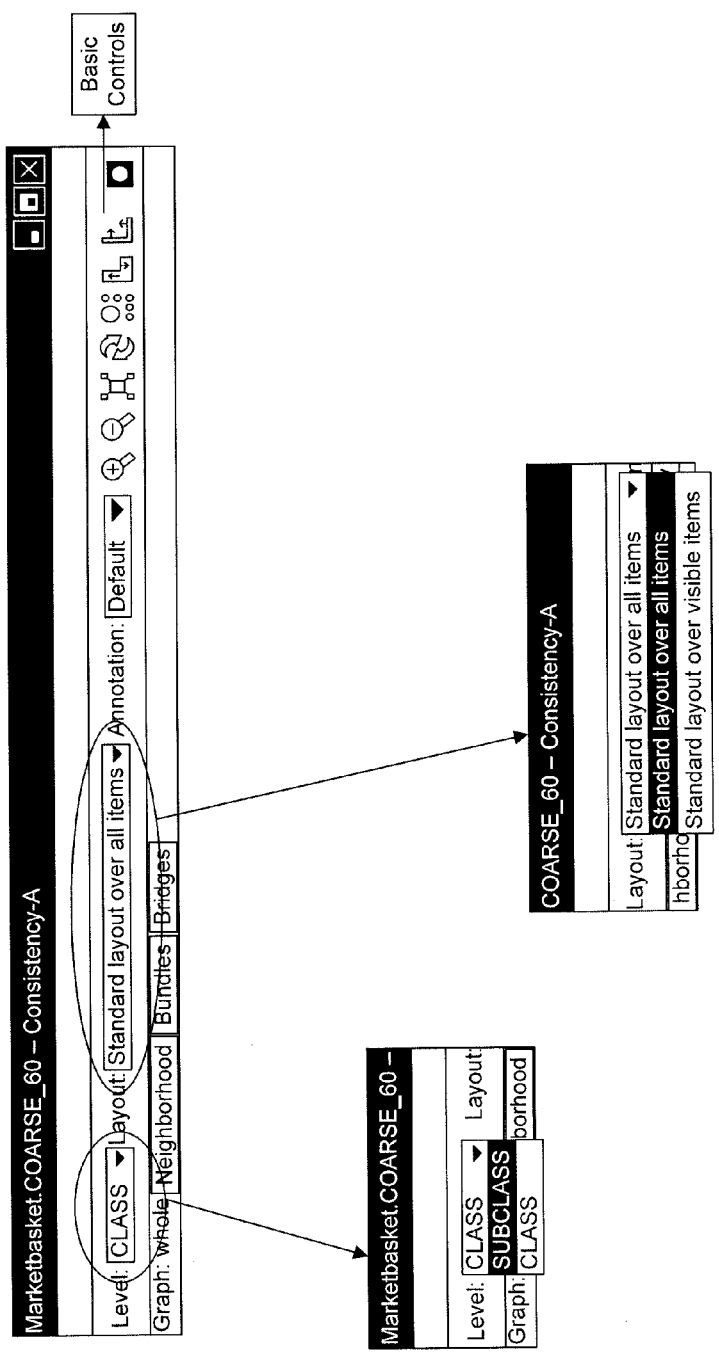
FIG. 12 is a screen shot showing the product space browser GUI graph panel basic controls according to the invention.

Basic Controls (FIG. 12)

FIG. 12 is a screen shot showing the product space browser GUI graph panel basic controls. In FIG. 12, the basic controls are shown, which include Class, as discussed above, and Layout. The basic controls allow users to pick the level for which the graph is to present information. The basic controls also show the active level of the current view. In the preferred embodiment of the invention, the graphs are projected onto a two-dimensional viewer. The standard layout over all items determines the position of each visible node relative to the set of all (visible plus hidden) nodes. The standard layout over visible items determines the position of each visible node relative to the set of visible nodes only.

Figure 13:
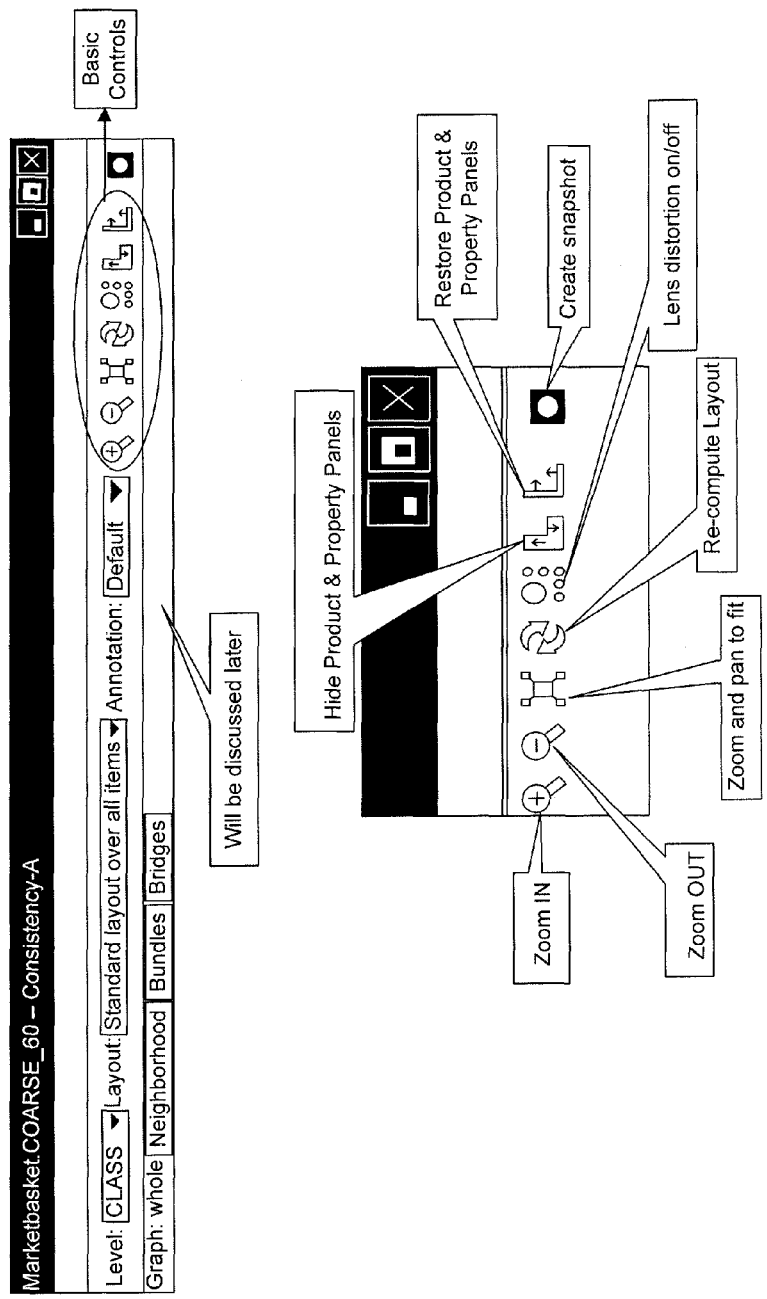
FIG. 13 is a screen shot of the product space browser GUI showing the basic controls of the graph panel according to the invention.
Figure 14:
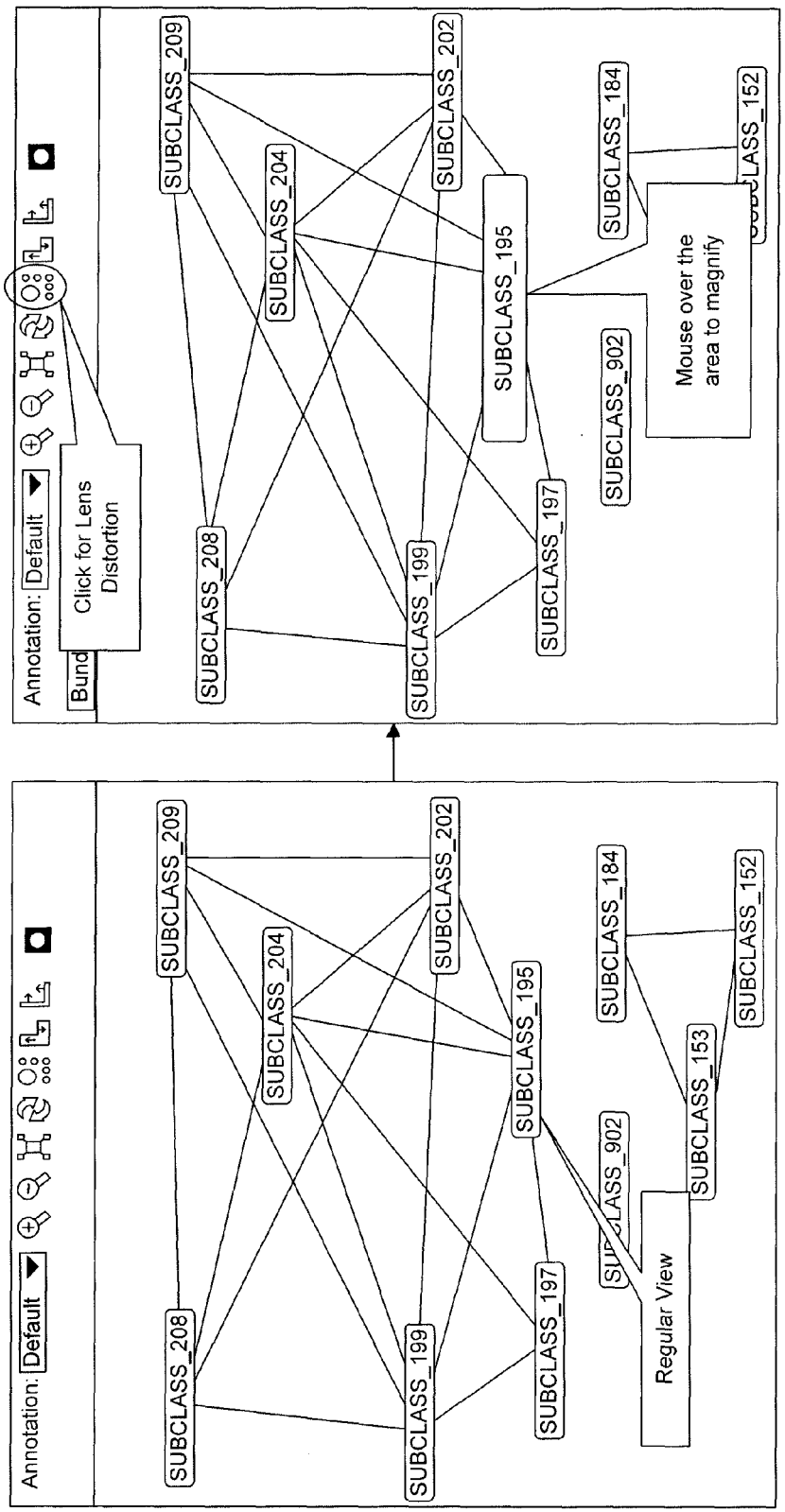
FIG. 14 is a screen shot showing the product space browser GUI graph panel basic controls according to the invention.

Basic Controls, Detailed (FIGS. 13 and 14)

FIG. 13 is a screen shot of the product space browser GUI showing the basic controls of the graph panel. In FIG. 13, the basic controls, as discussed above, are highlighted. In FIG. 13, icons are identified, including those that allow the user to zoom in, zoom out, zoom and pan to fit, re-compute layout, hide product and property panels, restore product and property panels, turn on or off a lens distortion feature, and create a snapshot.

FIG. 14 is a screen shot showing the product space browser GUI graph panel basic controls. In FIG. 14, the basic control feature shown is a regular view that has a lens distortion applied to it. In the left-hand panel, the regular view is shown; and in the right-hand panel, it is shown that the user may click a button to apply lens distortion. When the lens distortion is turned on a gesture, such as mousing over a particular area, magnifies that area. The magnification of an area is provided as an alternative to zooming and panning.

Figure 15:
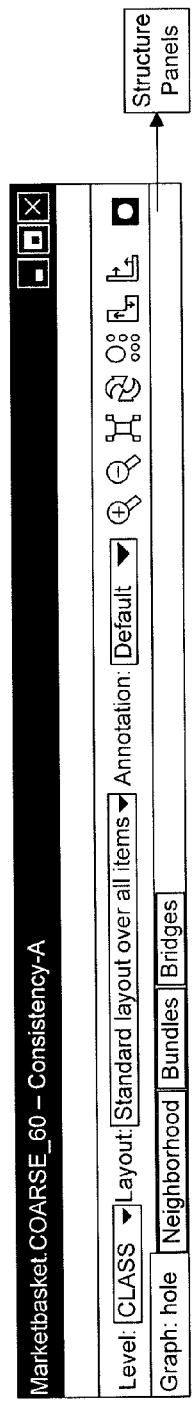
FIG. 15 is a screen shot showing the product space browser GUI graph panel structure panels according to the invention.

Structure Panels (FIG. 15)

FIG. 15 is a screen shot of the product space browser GUI graph panel structure panels. The structure panels shown in FIG. 15 allow such features as graph:whole, which is a sub-panel showing the entire graph at the selected level; and graph:subgraph, which is a sub-panel showing subgraphs (which are discussed in more detail below). For example, all SUB-CLASS products within the Class may be shown in the graph:subgraph structured view.

The structure panels also show Bundles, which is a sub-panel showing product bundles; and bridges, which is a sub-panel showing bridge structures. These are discussed in greater detail below.

Product Panel

Figure 16:
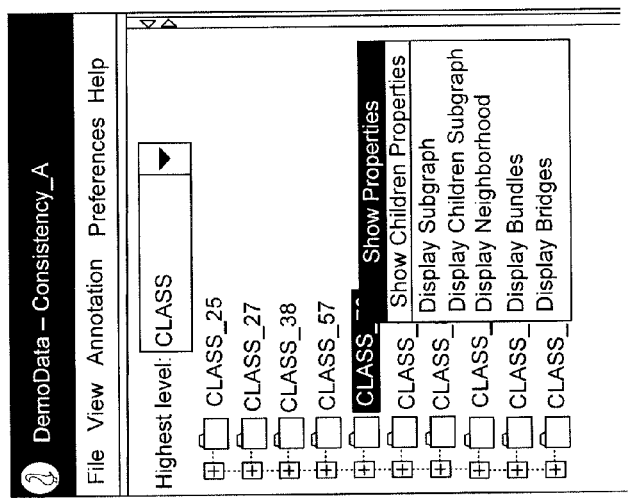
FIG. 16 is a screen shot showing product space browser functionality and, in particular, a single selection through the product panel according to the invention.

Single Selection (FIG. 16)

PSB Functionality (see FIGS. 16-48)

FIG. 16 is a screen shot showing product space browser functionality and, in particular, a single selection through the product panel. In FIG. 16, the user right-clicks on a product and a menu drops down. The menu allows the user to view properties of the selected product or its children.

Figure 17:
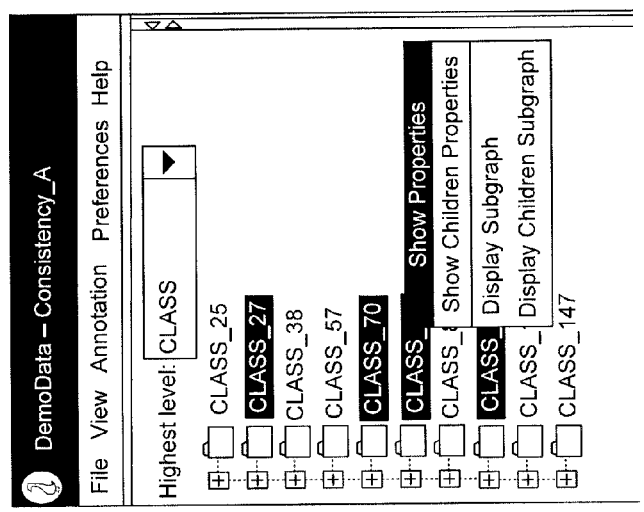
FIG. 17 is a screen shot showing product space browser functionality and, in particular, a multiple selection through the product panel according to the invention.

Right Click on a product->Drops down FULL MENU
    Show Properties->Shows properties of selected product
    Show Children Properties->Shows properties of children of selected products
    Display Subgraph->Shows subgraph at this level
    Display Children Subgraph->Shows subgraph of children of selected products
    Display Neighborhoods->Takes to neighborhood panel
    Display Bundles->Takes to the Bundle panel
    Display Bridges->Takes to the Bridges panel Multiple Selection (FIG. 17)

FIG. 17 is a screen shot showing product space browser functionality and, in particular, a multiple selection through the product panel according to the invention;

Select more than one products (use Ctrl key+Left Click)
    Right click to open the drop-down LIMITED MENU
    Show Properties->Shows properties of selected product
    Show Children Properties->Shows properties of children of selected products
    Display Subgraph->Shows subgraph at this level
    Display Children Subgraph->Shows subgraph of children of selected products Property Panel Single Selection (FIG. 18)

FIG. 18 is a screen shot showing product space browser functionality and, in particular, a single selection through this property panel according to the invention;

Select single products (Right Click)->Shows FULL MENU
    Allows Display Subgraph/Children subgraph as Product Panel
    Allows Neighborhood, Bundles, Bridges view of the product
    Also allows "Select All", "Invert Selection" and "Copy" (to clipboard)

Multiple Selection (FIG. 19)

FIG. 19 is a screen shot showing product space browser functionality and, in particular, multiple selection through the property panel.

Select more than one product (use Ctrl key+Left Click)
    Right click to open the LIMITED MENU
    Allows Display Subgraph/Children subgraph as Product Panel
    Also allows "Select All", "Invert Selection" and "Copy" (to clipboard)

Figure 20:
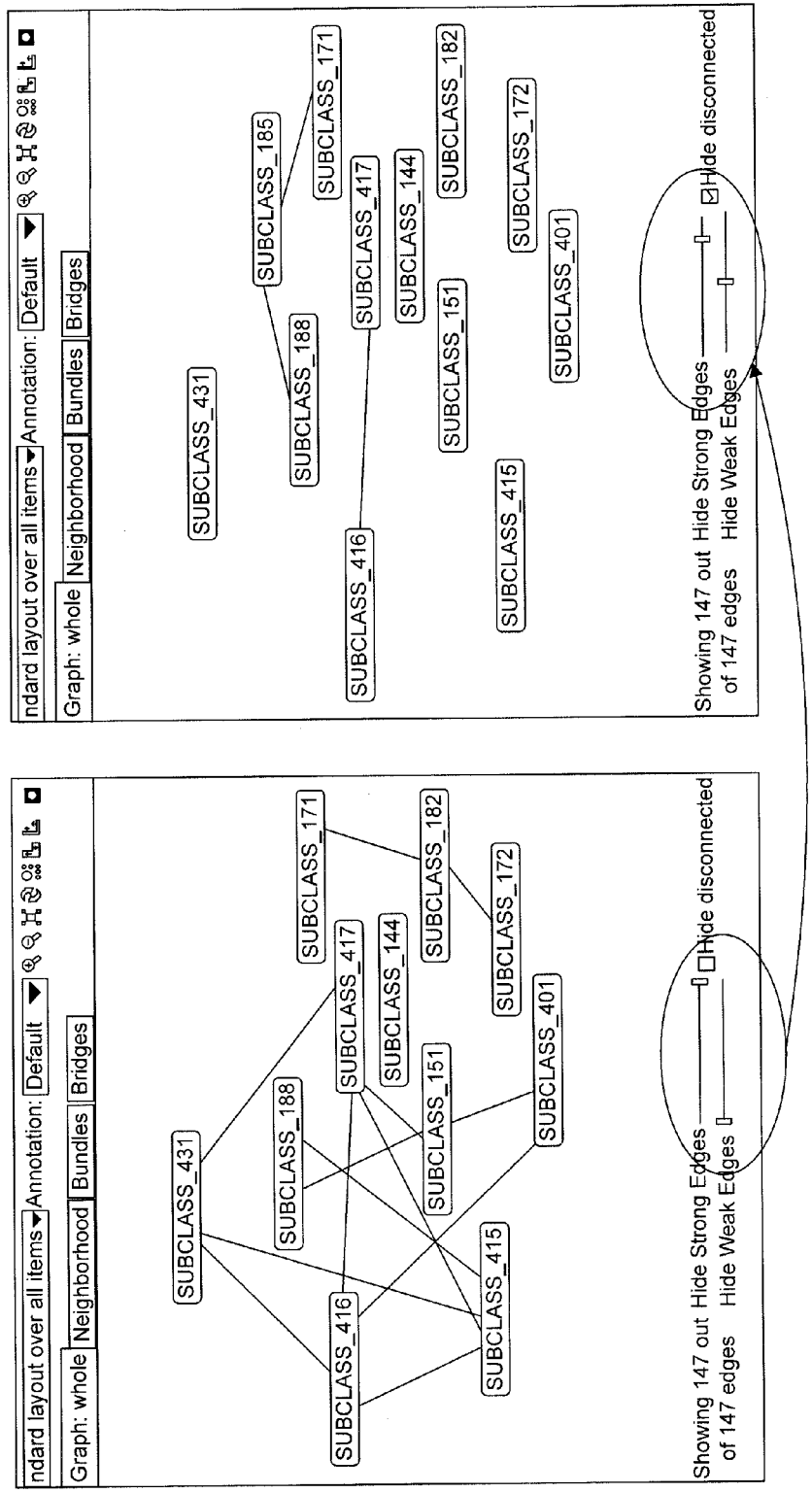
FIG. 20 is a screen shot showing present space browser functionality for the graph/subgraph prior in which this user may operate sliders to control edge display according to the invention.

Sliders to Control Edge Display (FIG. 20)

FIG. 20 is a screen shot showing product space browser functionality for the graph/subgraph prior in which this user may operate sliders to control edge display according to the invention;

Hide strong/weak edges using the two sliders

Figure 21:
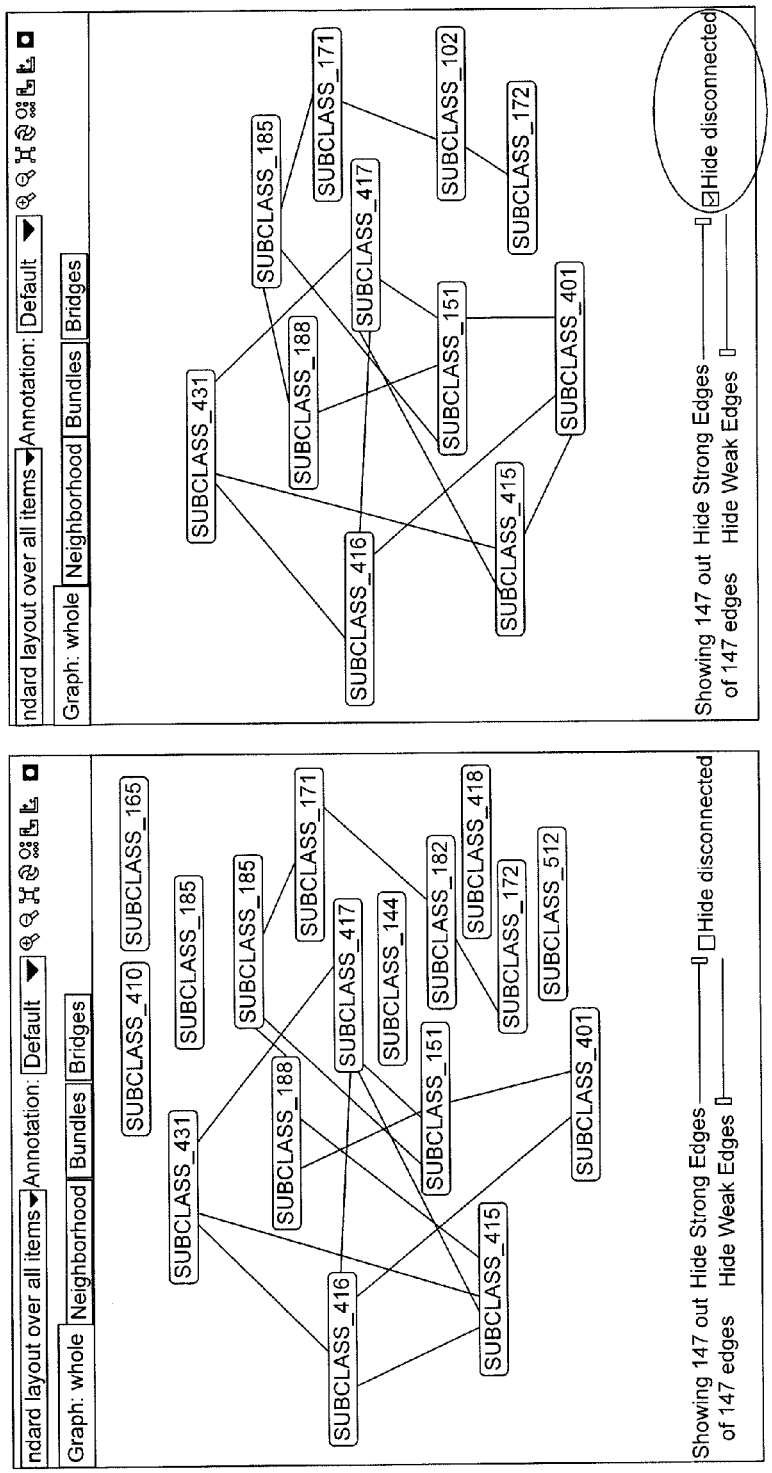
FIG. 21 is a screen shot showing product space browser functionality for the graph/subgraph panel, in which the user may show or hide connected nodes, according to the invention.

Show/Hide Connected Nodes (FIG. 21)

FIG. 21 is a screen shot showing product space browser functionality for the graph/subgraph panel in which the user may show or hide connected nodes. In FIG. 21, the left-hand panel shows that the user has not selected the Hide Disconnected button and all nodes are showing. On the right-hand side, the user has selected the Hide Disconnected feature and only those nodes which are connected are shown.

Figure 22:
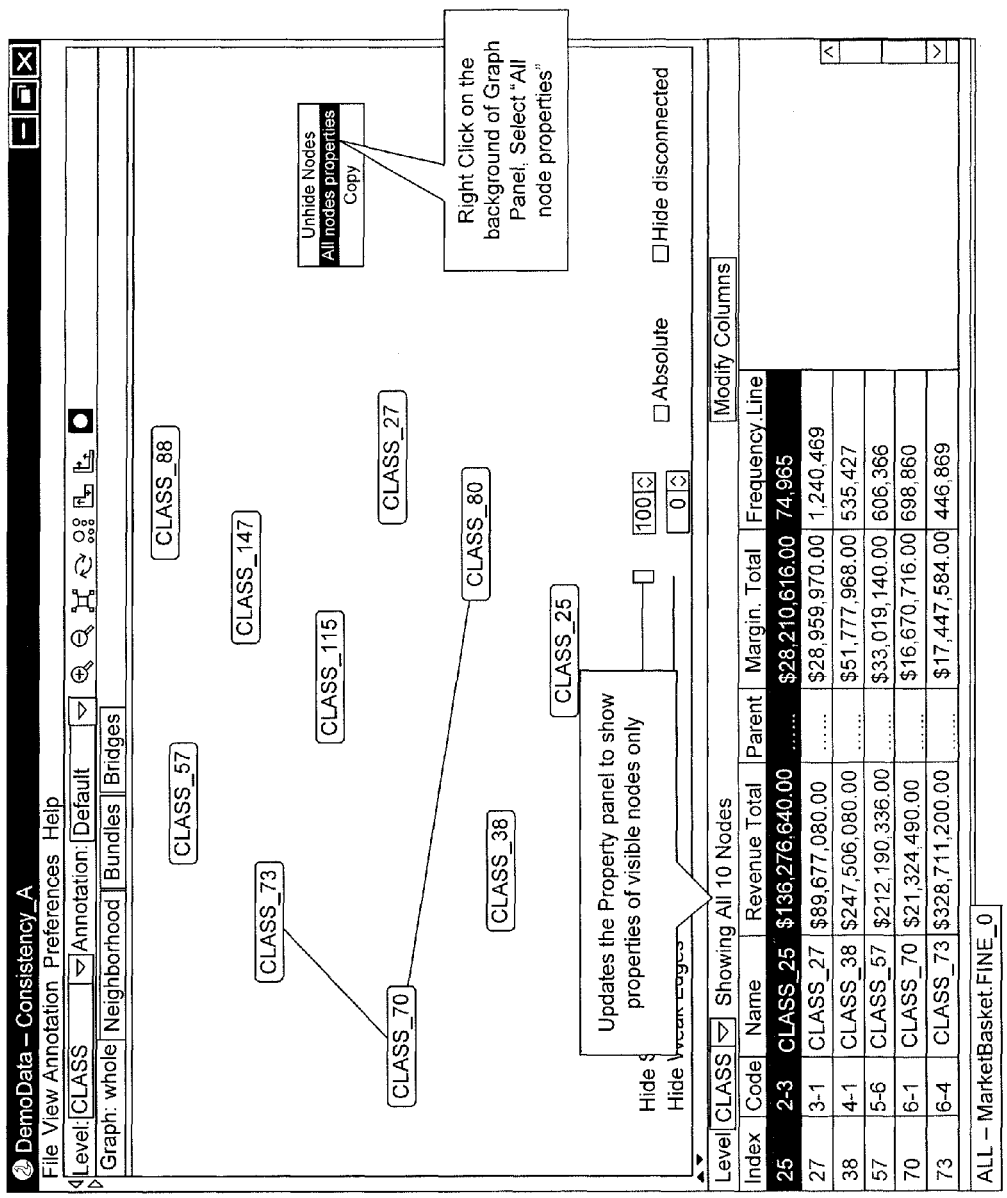
FIG. 22 is a screen shot showing product space browser functionality for the graph/subgraph panel, in which properties of visible nodes are shown, according to the invention.

Showing Properties of Visible Nodes (FIG. 22)

FIG. 22 is a screen shot showing product space browser functionality for the graph/subgraph panel in which properties of visible nodes are shown. In FIG. 22, the user may right-click on the background of the graph panel to select all node properties. This updates the property panel to show properties of visible nodes only.

Figure 23:
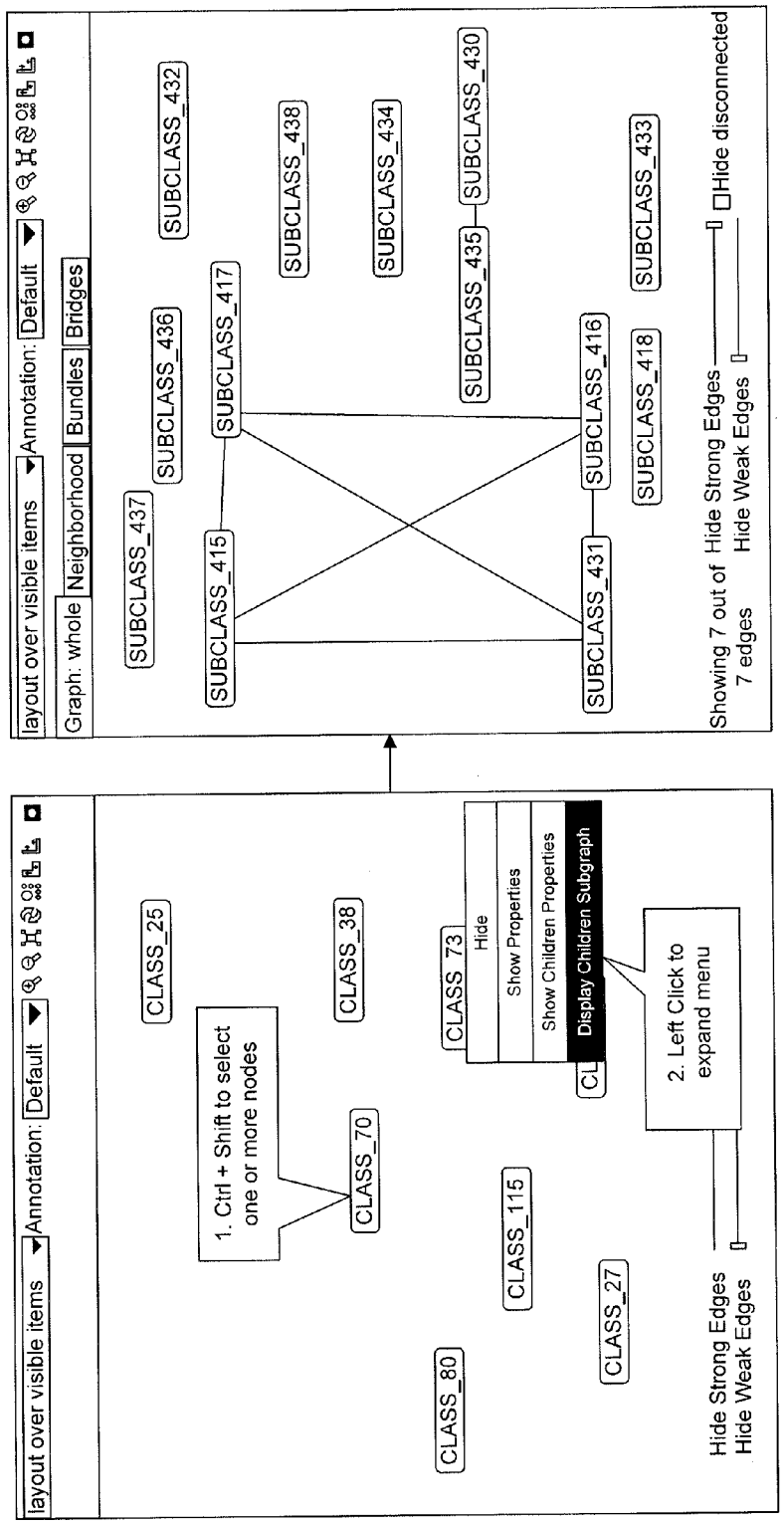
FIG. 23 is a screen shot showing product space browser functionality for the graph/subgraph panel, in which a user may drill down to finer product levels, according to the invention.

Drilling Down Finer Product Levels (FIG. 23)

FIG. 23 is a screen shot showing product space browser functionality for the graph/subgraph panel in which a user may drill down to finer product levels. In FIG. 23, it is shown that a user may drill down any part of the product space, i.e. a subset of nodes, from a coarser level to a finer level. To do so, the user may use Control or Shift to select one or more nodes. The user may then left-click on a drop-down menu to expand the menu. In this example, the user selects the display of a children subgraph and, as shown in the right-hand panel of FIG. 23, the connections between the sub-classes are shown.

Figure 24:
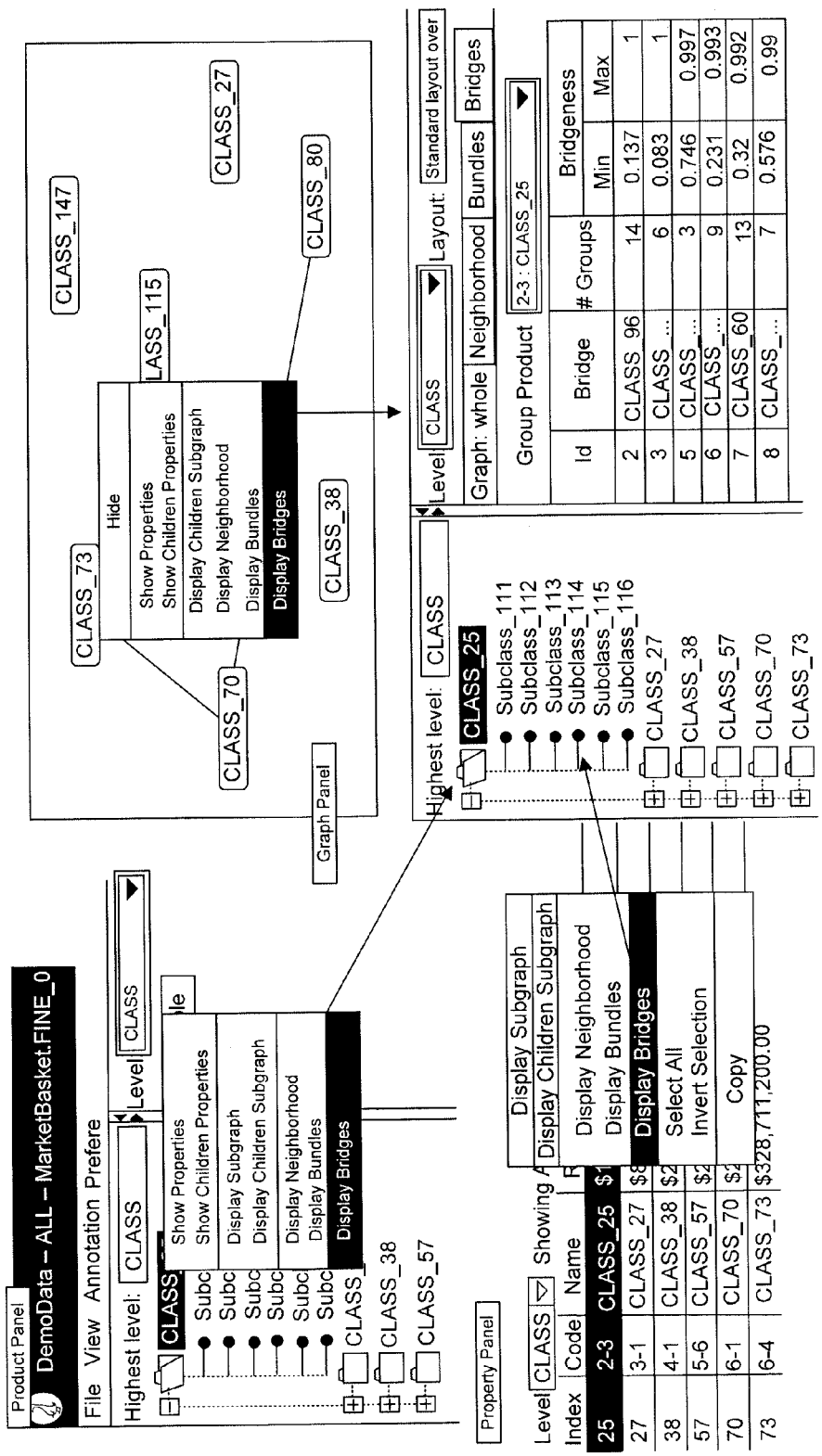
FIG. 24 is a series of screen shots showing product space browser functionality for the graph/subgraph panel, in which panels are shown as being linked, according to the invention.

Panels are Linked (FIG. 24)

FIG. 24 is a series of screen shots showing product space browser functionality for the graph/subgraph panel in which panels are shown as being linked. In the example of FIG. 24, a user may select an item from the product/property/graph panel. The user may view a subgraph, neighborhood, bundles, or bridges, to drill down on that item. In FIG. 24 a product panel is shown and the user selects the display of bridges. FIG. 24 also shows a property panel in which the user has selected to display bridges and a graph panel in which the user has selected to display bridges.

Figure 25:
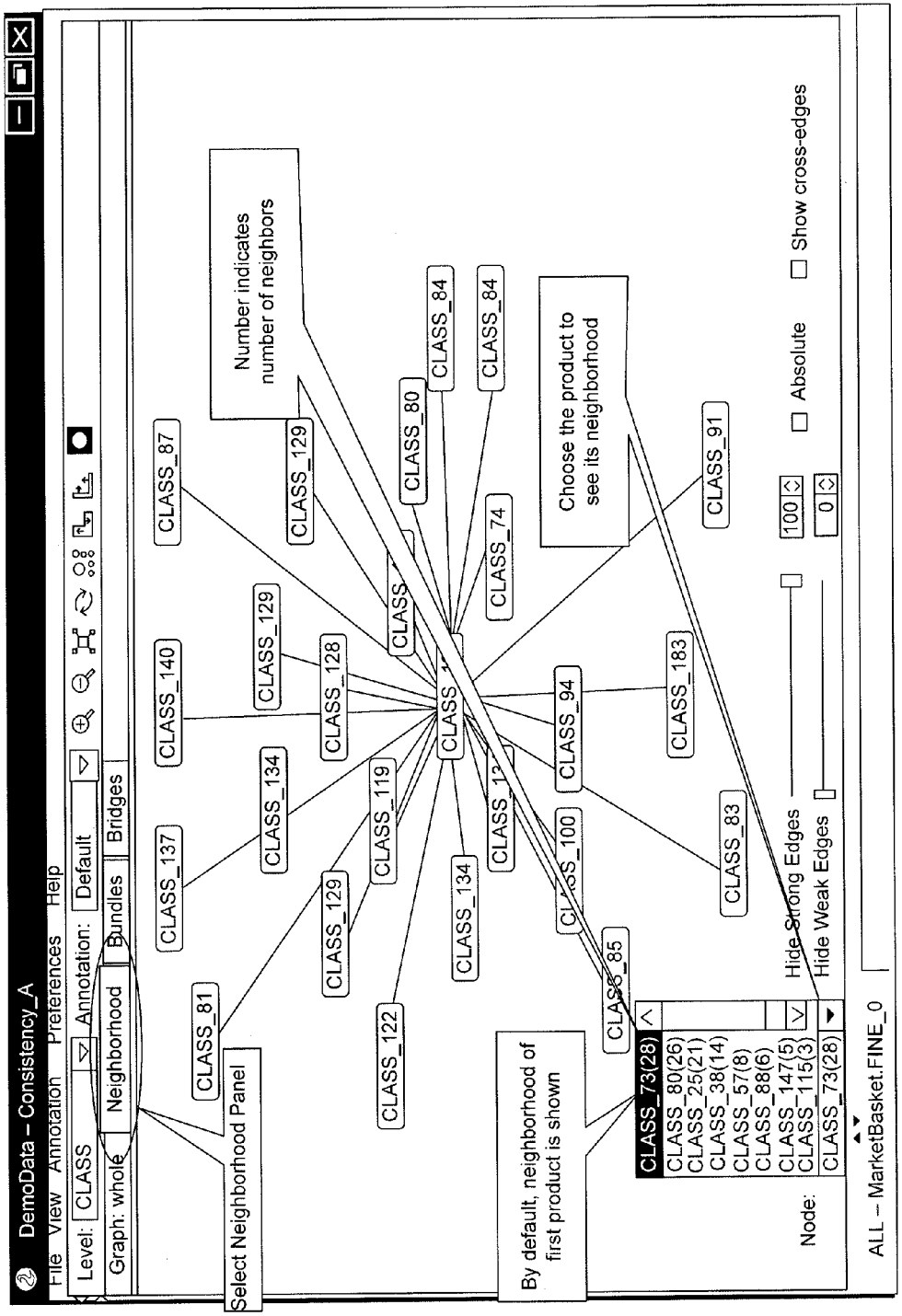
FIG. 25 is a screen shot showing product space browser functionality for a neighborhood panel, in which the user may pick a product and see the product's neighborhood, according to the invention.

Picking a Product to See its Neighborhood (FIG. 25)

FIG. 25 is a screen shot showing product space browser functionality for a neighborhood panel, in which the user may pick a product and see the product's neighborhood. In FIG. 25, a user selects neighborhood panel. By default, the neighborhood of a first product is shown. For the neighborhood, an associated number indicates the number of neighbors. The user may then select a product to see its neighborhood. FIG. 25 shows the neighborhood for the selected product.

Figure 26:
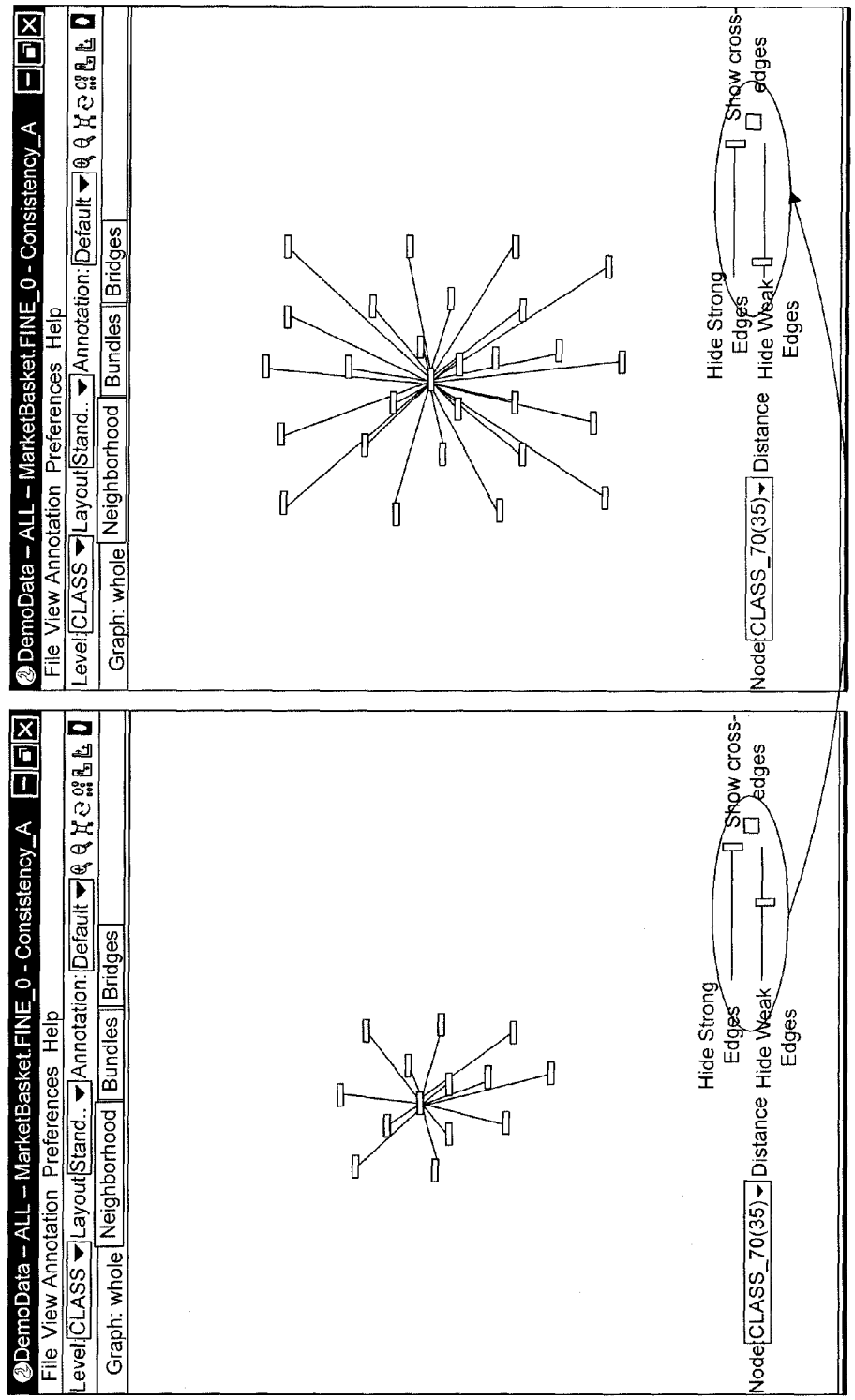
FIG. 26 is a screen shot showing product space browser functionality for the neighborhood panel, in which the user may increase the size of the visible neighborhood, according to the invention.

Increasing the Size of Visible Neighborhood (FIG. 26)

FIG. 26 is a screen shot showing product space browser functionality for the neighborhood panel in which the user may increase the size of the visible neighborhood. To do this, the user moves the slider to see as many neighborhoods as desired from nearest to farthest. Thus, the left-hand panel of FIG. 26 shows slider settings in which a smaller neighborhood is shown, while the right-hand panel shows a slider setting in which a larger neighborhood is shown.

Neighborhood Panel

Figure 27:
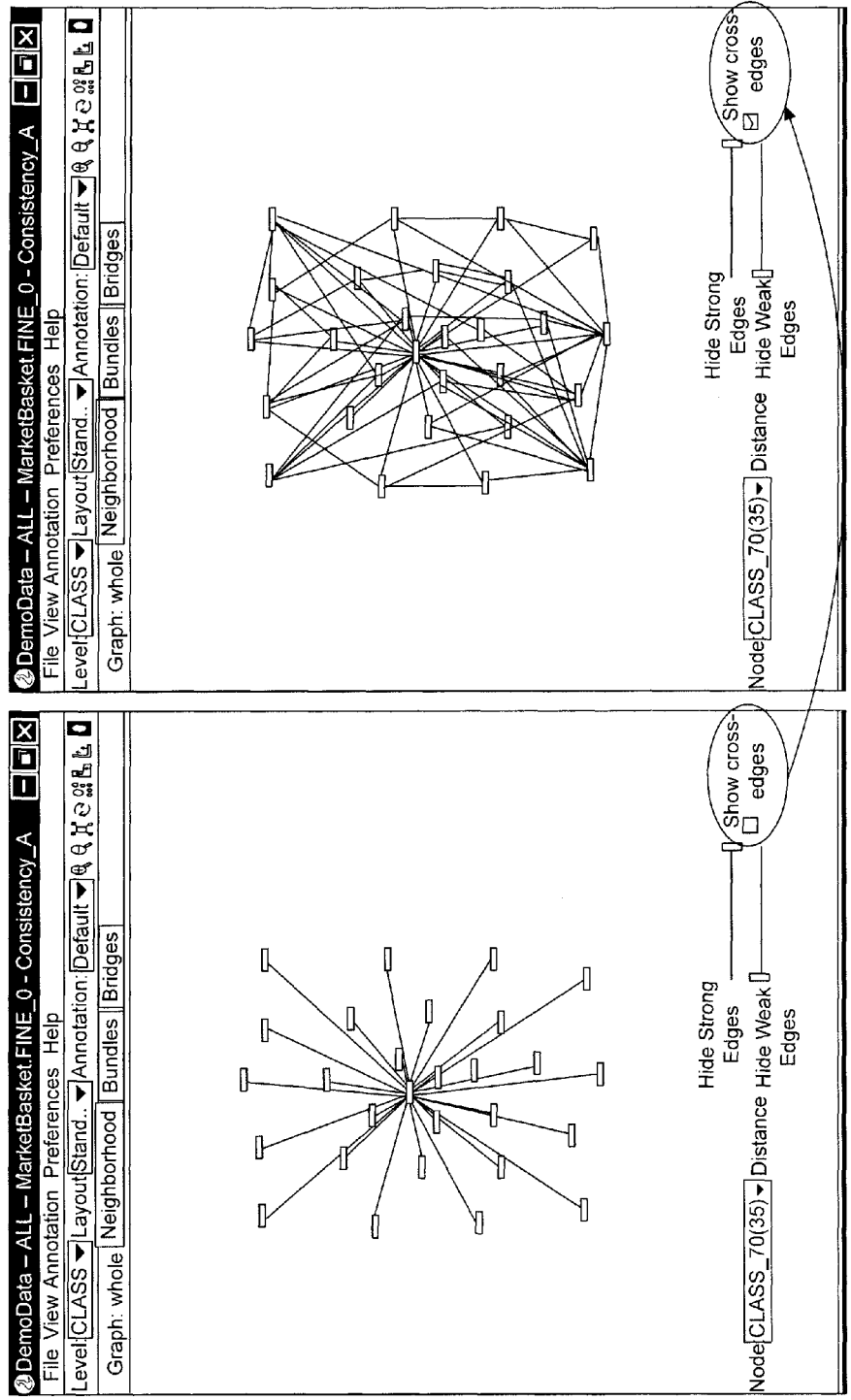
FIG. 27 is a screen shot showing product space browser functionality in connection with the neighborhood panel, in which the user may see cross-edges among neighbors, according to the invention.

Seeing Cross-Connections Among Neighbors (FIG. 27)

FIG. 27 is a screen shot showing product space browser functionality in connection with the neighborhood panel in which the user may see cross-edges among neighbors. To do so, the user clicks on the Show Cross-Edges button to see the entire neighborhood graph. The left-hand panel on FIG. 27 shows the neighborhood in which cross-edges are not selected. The right-hand panel in FIG. 27 shows that the user has selected the Show Cross-Edges button and the display displays the neighborhood including all cross-edges.

Figure 28:
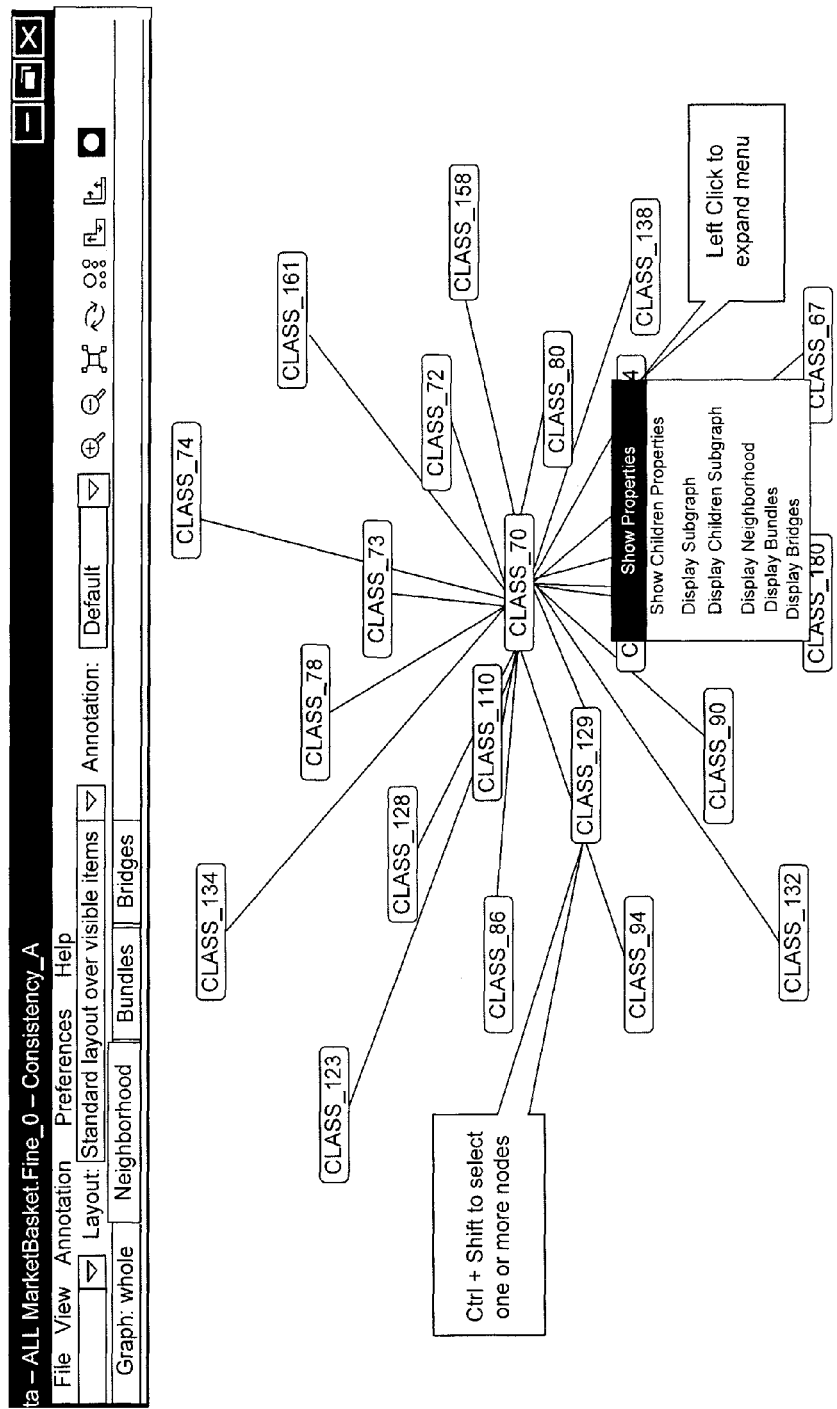
FIG. 28 is a screen shot showing product space browser functionality for the neighborhood panel, in which the user can drill down, as in the graph panel, according to the invention.

Ability to Drill Down etc. as in Graph Panel (FIG. 28)

FIG. 28 is a screen shot showing product space browser functionality for the neighborhood panel in which the user can drill down, as in the graph panel. In the example of FIG. 28, the user performs a gesture, such as Control+Shift, to select one or more nodes. A left-click on the selected node expands the menu to show the possibilities with regard to drilling down.

Bundle Panel

Figure 29:
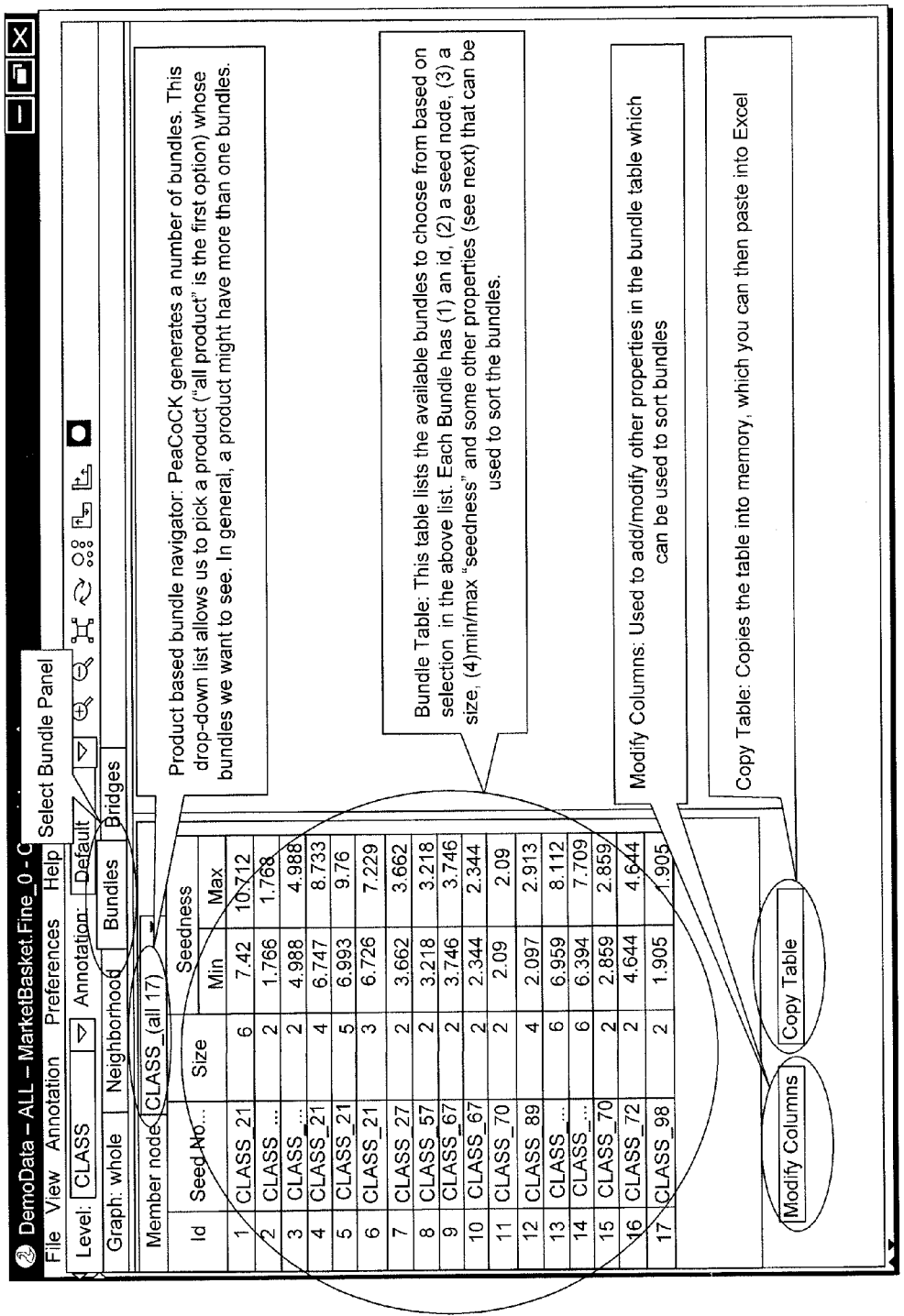
FIG. 29 is a screen shot showing product space browser functionality for the bundle panel according to the invention.

Understanding the Bundle Panel (FIG. 29)

FIG. 29 is a screen shot showing product space browser functionality for the bundle panel. In FIG. 29, the user may select the bundle panel. When the user selects the bundle panel, a product-based bundle navigator is provided. The underlying engine generates a number of bundles. The drop-down list that is provided upon selection of the bundle panel allows the user to pick a product whose bundles the user wishes to see. The first option is to pick all of the products. In general, a product might have more than one bundle. The bundle table lists the available bundles to choose from, based on selection in the list of member nodes. Each bundle has an ID, a seed node, a size, minimum and maximum seedness, and some other properties (discussed below) that can be used to sort the bundles. The user may also modify columns to add or modify other properties in the bundle table, which can be used to sort the bundles. The user may also copy the table into memory, and it may be pasted into a spreadsheet program, such as Microsoft Excel.

Figure 30:
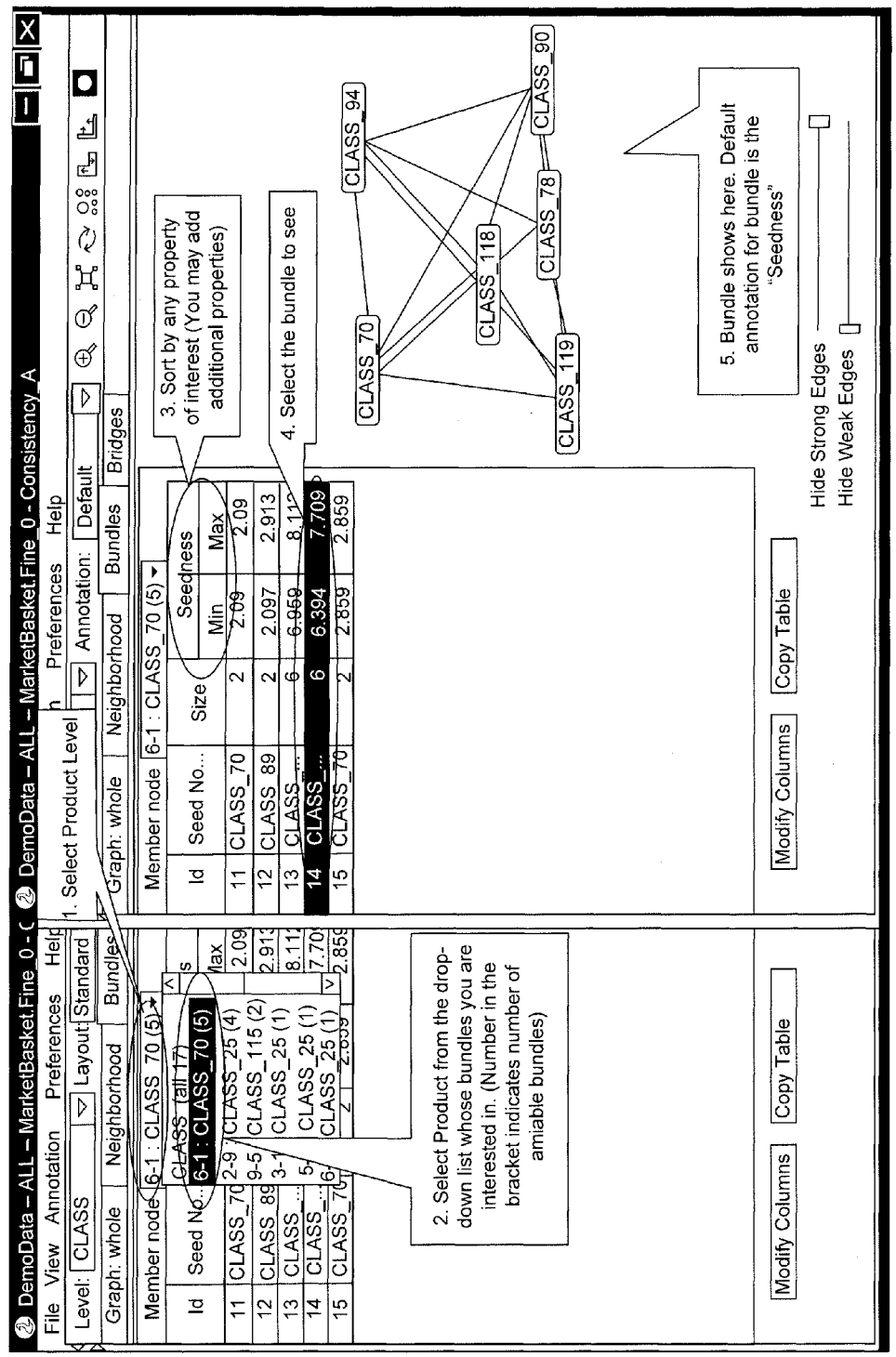
FIG. 30 is a screen shot showing product space browser functionality for the bundle panel, in which the user chooses a bundle to browse, according to the invention.

Choosing a Bundle to Browse (FIG. 30)

FIG. 30 is a screen shot showing product space browser functionality for the bundle panel in which the user chooses a bundle to browse. In FIG. 30, the user first selects the product level. The user then selects the product from a drop-down list having bundles in which the user is interested. The number in the bracket in FIG. 30 indicates the number of available bundles, in this case five bundles are available. The user may sort the bundles by any property of interest, or may add additional properties. The user then selects the bundle to be seen, and the bundle is shown in the display. As seen in FIG. 30 in this embodiment of the invention, the default annotation for bundles is the seedness of the bundle.

Figure 31:
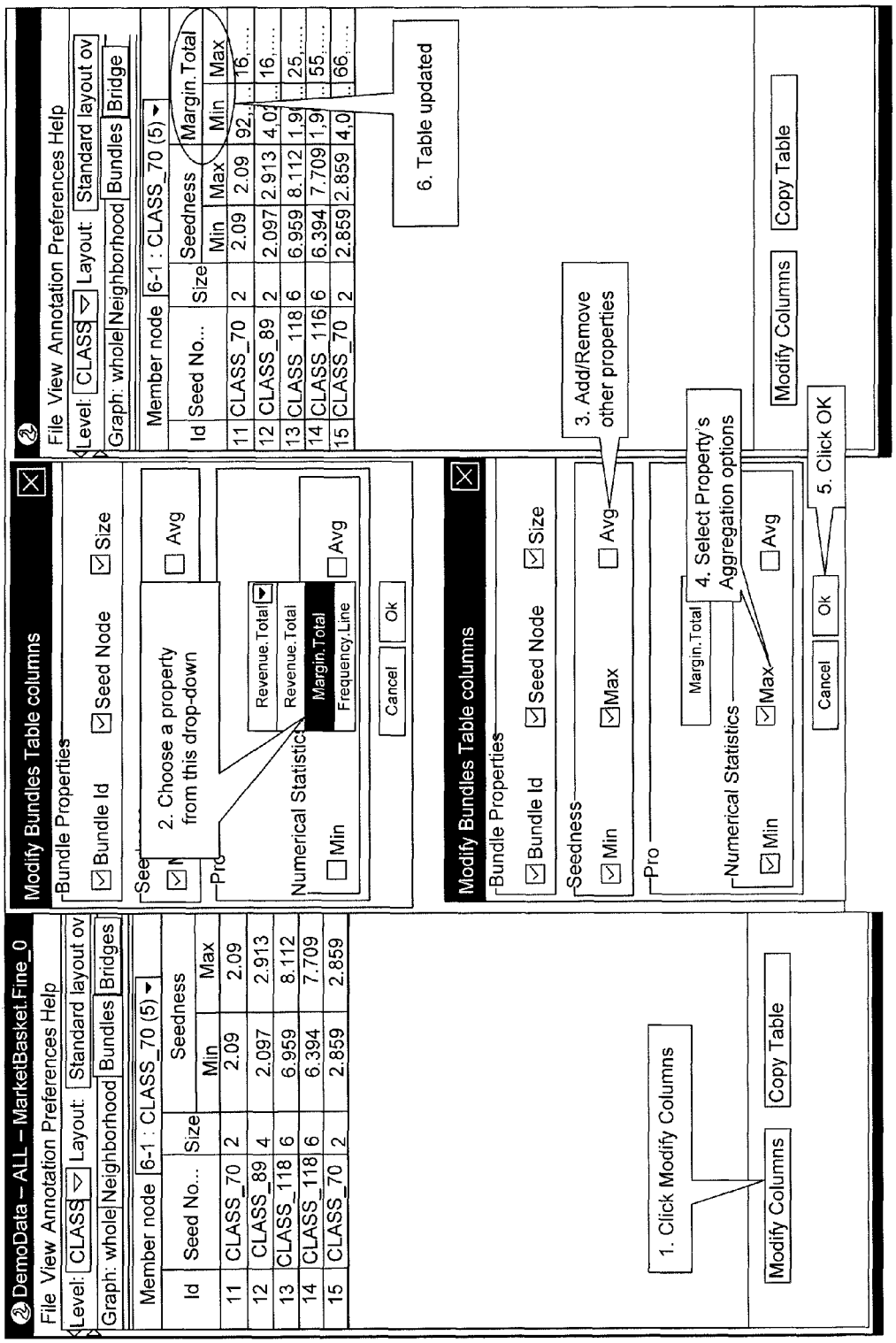
FIG. 31 is a screen shot showing product space browser functionality for the bundle panel, in which the user may choose a bundle property to browse, according to the invention.

Choosing a Bundle Property to Browse (FIG. 31)

FIG. 31 is a screen shot showing product space browser functionality for the bundle panel in which the user may choose a bundle property to browse. In FIG. 31, the user may click the Modify Columns button. The user can then choose a property from a drop-down menu. The user may also add or remove other properties, select the property's aggregation options, and, when done, click Okay. Thereafter, an updated table is shown. In the example of FIG. 31, the user has added a margin total property showing minimum and maximum statistics for that property. The updated table on the right shows that this property has been added to the display.

Figure 32:
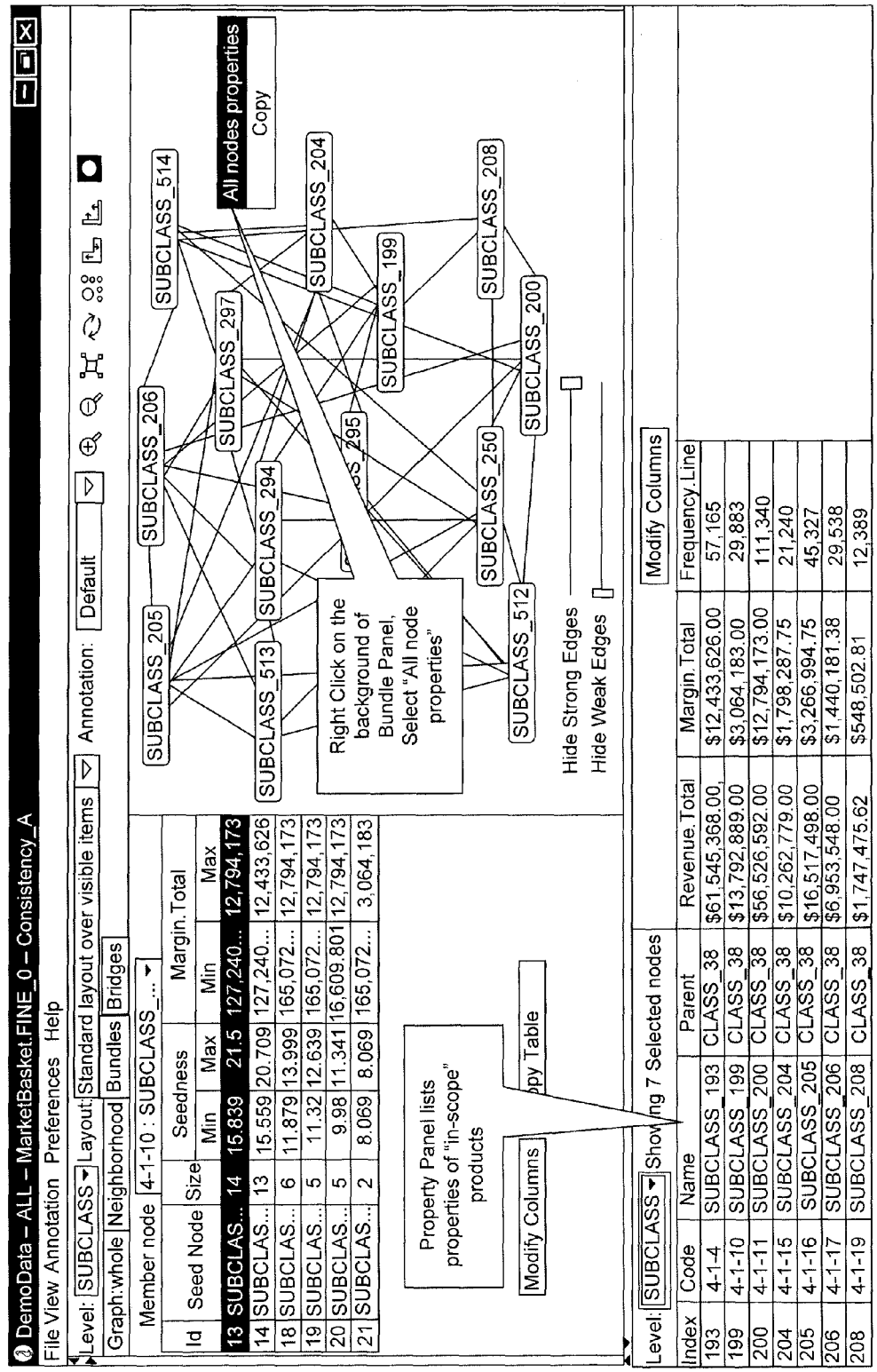
FIG. 32 is a screen shot showing product space browser functionality for the bundle panel, showing the property of all bundle products according to the invention.

Showing Property of all Bundle Products (FIG. 32)

FIG. 32 is a screen shot showing product space browser functionality for the bundle panel, showing the property of all bundle products. In FIG. 32, the property panel lists properties of in-scope products. The user may right-click on the background of the bundle panel and select all node properties.

Bridge Panel

Figure 33:
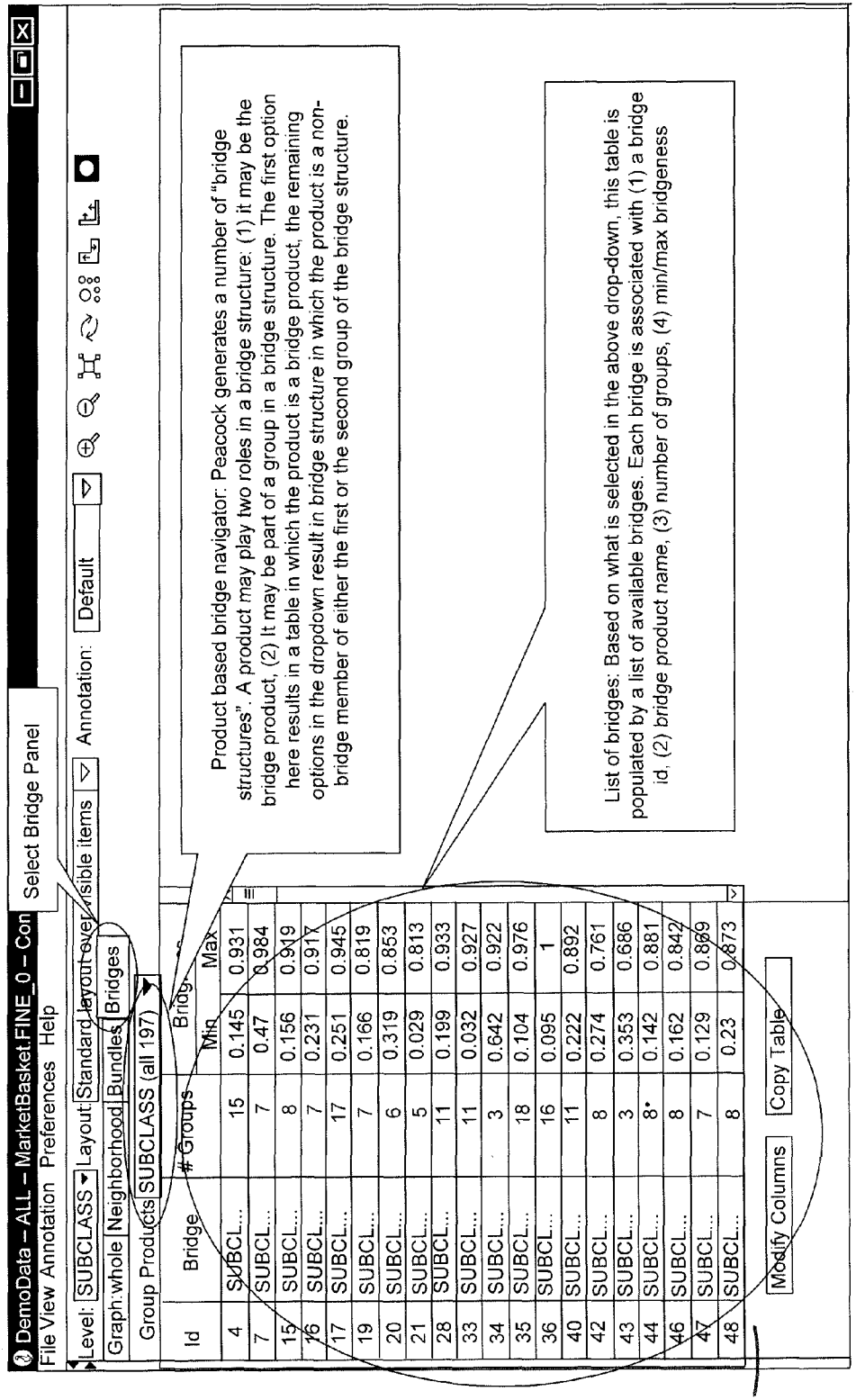
FIG. 33 is a screen shot showing product space browser functionality in connection with the bridge panel according to the invention.

Understanding the Bridge Panel (FIG. 33)

FIG. 33 is a screen shot showing product space browser functionality in connection with the bridge panel. In FIG. 33, the user selects the bridge panel. The bridge panel is a product-based bridge navigator. The underlying analytical engine generates a number of bridge structures. A product may play two roles in a bridge structure: it may be a bridge product, or it may be part of a group in a bridge structure. The first option shown in FIG. 33 results in a table in which the product is a bridge product. The remaining options in the drop-down menu result in bridge structures in which the product is a non-bridge member of either the first or the second group of a bridge structure. FIG. 33 shows a list of bridges. Based upon what is selected in the drop-down, the table is populated by a list of available bridges. Each bridge is associated with a bridge ID, bridge product name, member groups, and minimum and maximum bridgeness value.

Figure 34:
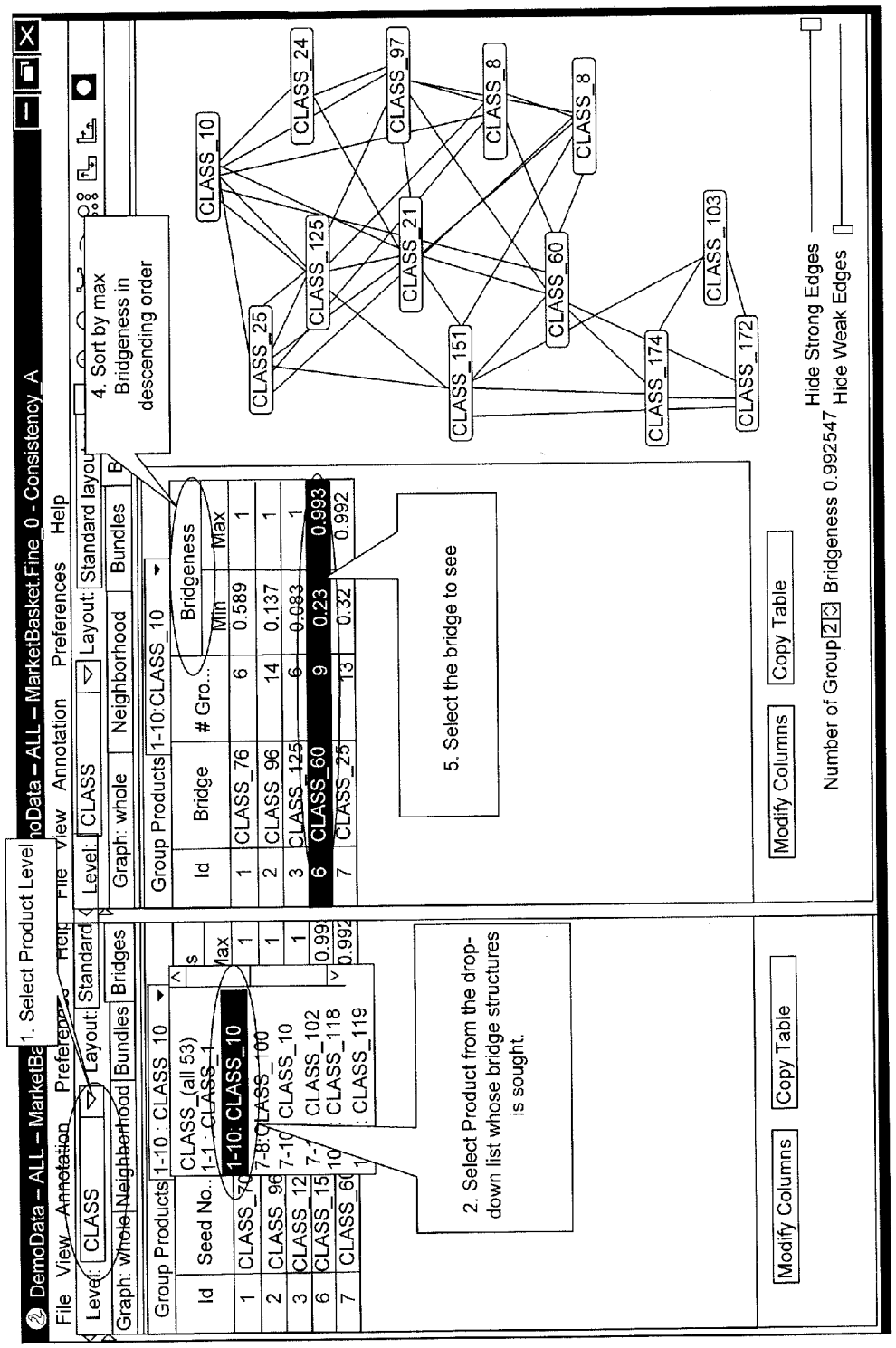
FIG. 34 is a screen shot showing product space browser functionality for a bridge panel, in which a user may choose a bridge structure to browse, according to the invention.

Choosing a Bridge Structure to Browse (FIG. 34)

FIG. 34 is a screen shot showing product space browser functionality for a bridge panel in which a user may choose a bridge structure to browse. In FIG. 34, a user selects a product level. The user then selects a product from the drop-down list whose bridge structures are sought. The user may choose to sort by maximum bridgeness in descending order and select a bridge to see. The display then illustrates the selected bridge with the attributes as determined by the user.

View

Figure 35:
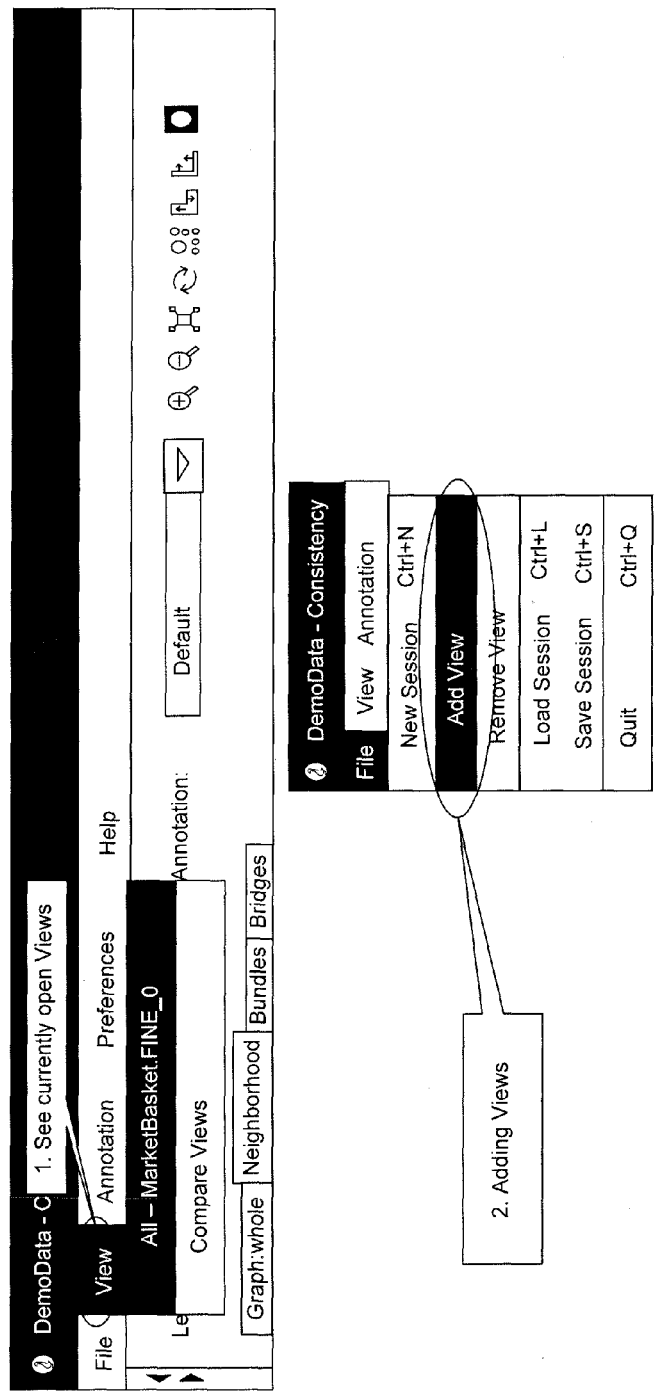
FIG. 35 is a screen shot showing product space browser functionality for a view function according to the invention.

Currently Open Views & Adding Views (FIG. 35)

FIG. 35 is a screen shot showing product space browser functionality for a view function. In FIG. 35, the user may select the view function to see all currently open views. The user may also add a view. With views, the user can open two product spaces as tabs if they have the same directory and consistency measure. The view menu helps the user navigate between these tabs and allows the user to compare views. Views can also be added, as discussed above.

Figure 36:
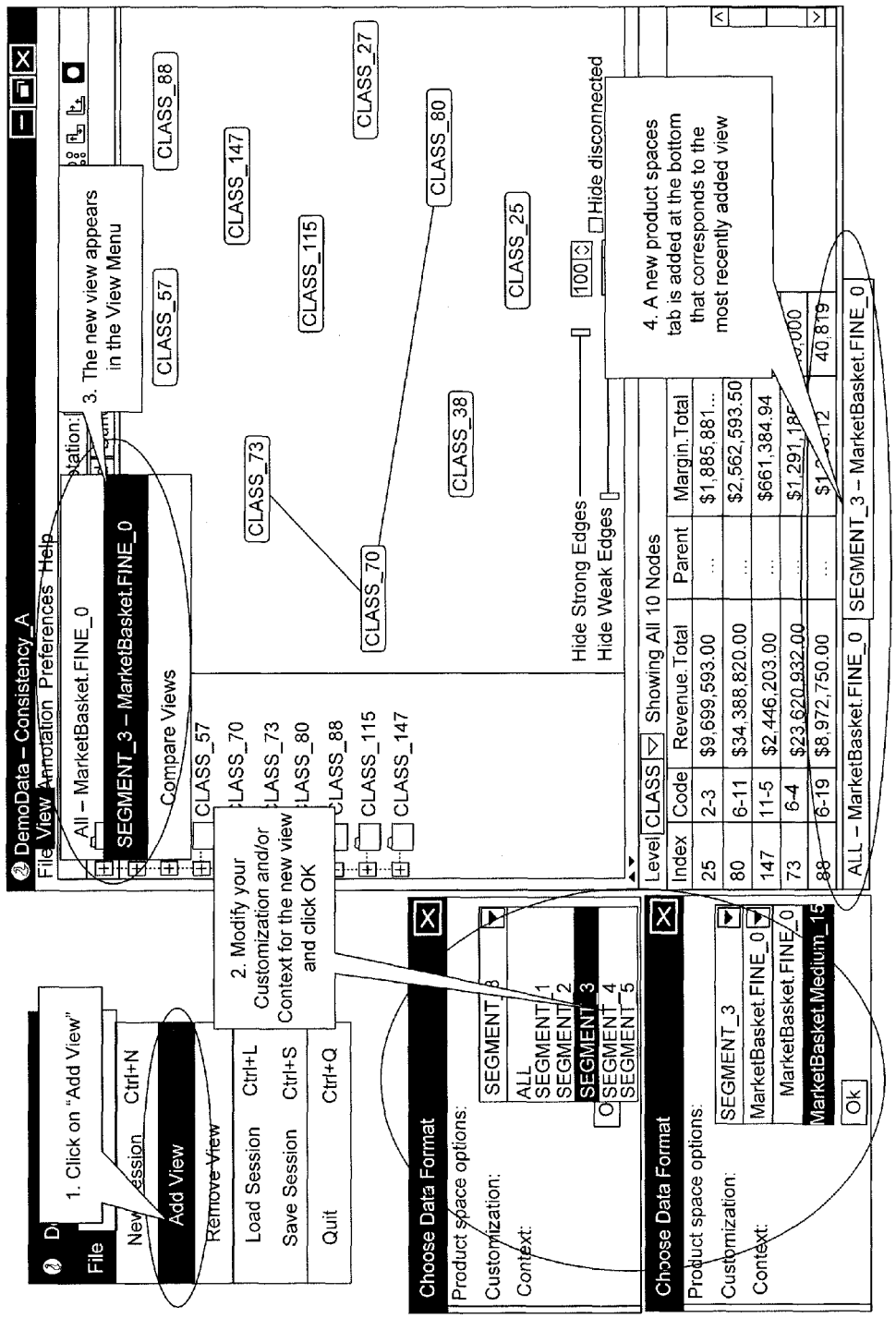
FIG. 36 is a screen shot in connection with product space browser functionality showing adding a view according to the invention.

Adding Views (FIG. 36)

FIG. 36 is a screen shot in connection with product space browser functionality showing adding a view. In FIG. 36, a user clicks on the Add View button and then can modify customization and/or context for the new view and click Okay to accept the changes. The new view then appears in the view menu. A new product space tab is then added at the bottom of the display which corresponds to the most recently added view.

Figure 37:
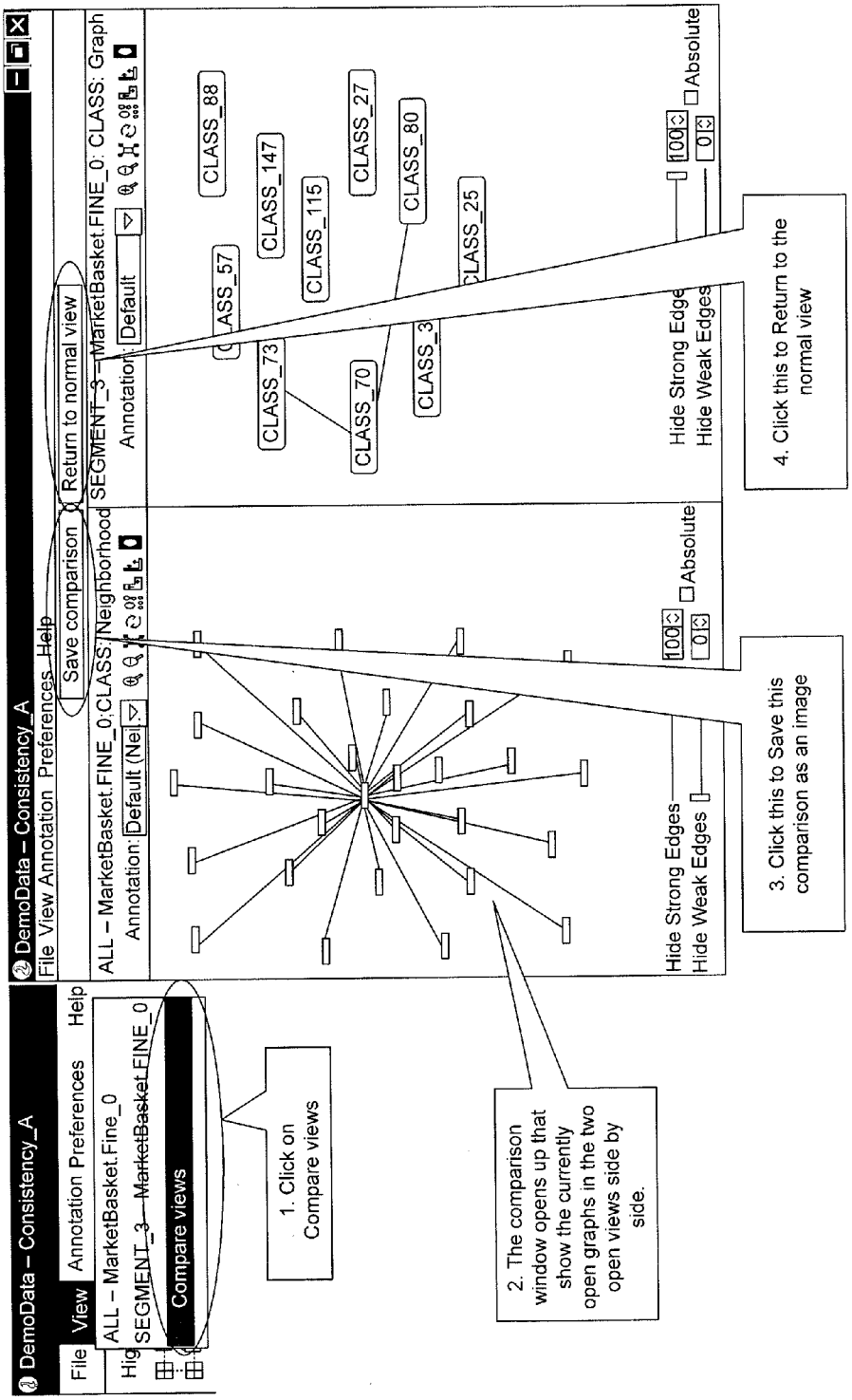
FIG. 37 is a screen shot showing product space browser functionality in connection with the comparison of views according to the invention.
Figure 38:
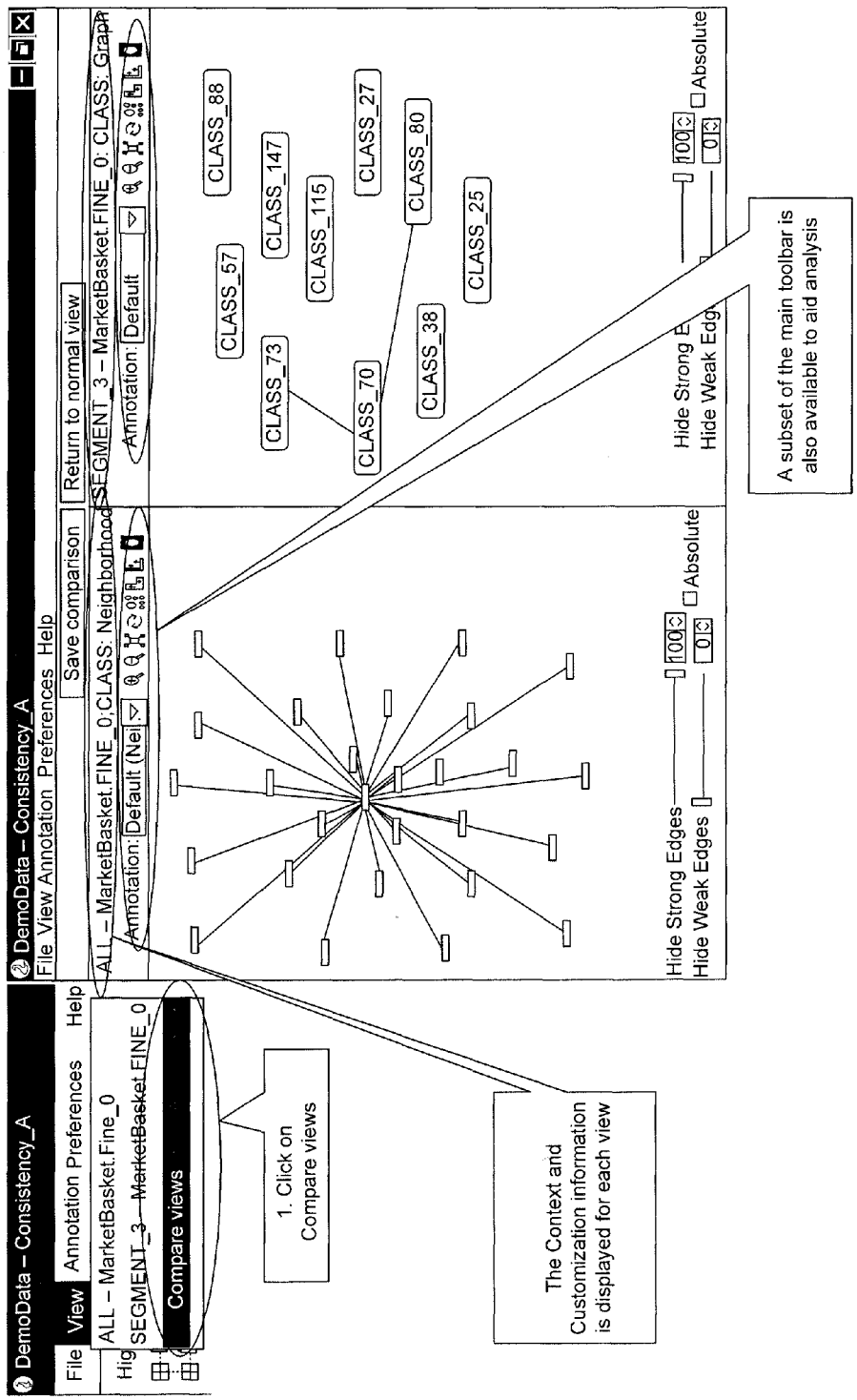
FIG. 38 is a screen shot showing product space browser functionality in connection with the comparison of views according to the invention.

Comparing Views (FIGS. 37 and 38)

FIG. 37 is a screen shot showing product space browser functionality in connection with the comparison of views. In FIG. 37, the user may click on the Compare Views button. A comparison window opens up that shows the currently opened graphs in two open views side by side. The user may click on a button to save the comparison as an HTML report, containing images and a text summary, or click on another button to return to the normal view.

FIG. 38 is a screen shot showing product space browser functionality in connection with the comparison of views. In FIG. 38, the user may click on the Compare Views button and the context and customization information is displayed for each view. A sub-set of the main toolbar is also available to aid analysis. Thus, FIGS. 37 and 38 provide, in combination, an illustration of the features that are provided by the invention in connection with comparison of views.

Annotation

Figure 39:
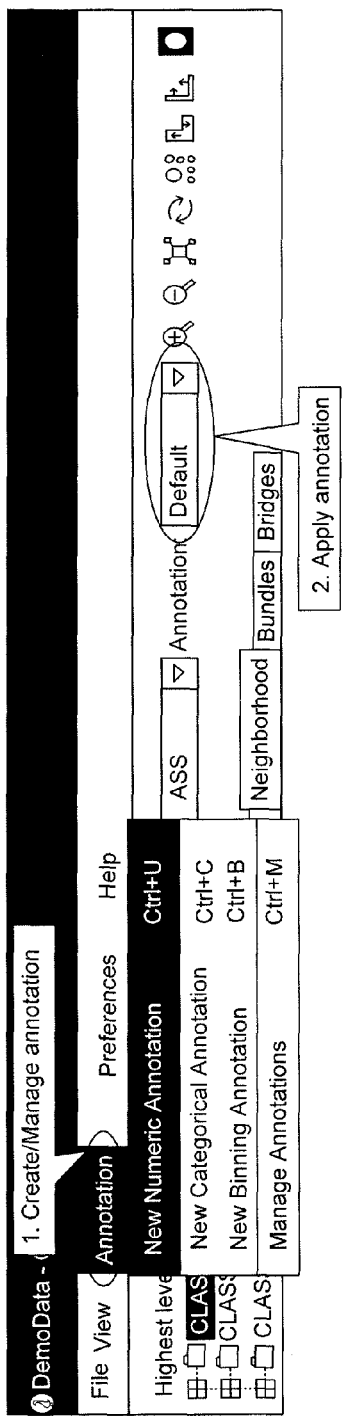
FIG. 39 is a screen shot showing product space browser functionality in connection with annotations according to the invention.

Types of Annotations and Annotation Manager (FIG. 39)

FIG. 39 is a screen shot showing product space browser functionality in connection with annotations. In FIG. 39, the user can create or manage an annotation and can as well apply the annotation. In the invention, there are three types of annotations. A numeric annotation is a continuous or numerical property, e.g. BAM. A categorical annotation is a categorical property, e.g. manufacturer. A binning annotation is an annotation for binning of numeric properties, e.g. quartile or decile. There are two steps in an annotation. An annotation is created and then is applied to a current graph in the graph panel.

Step 1: Creating Annotations (FIG. 40)

Figure 40:
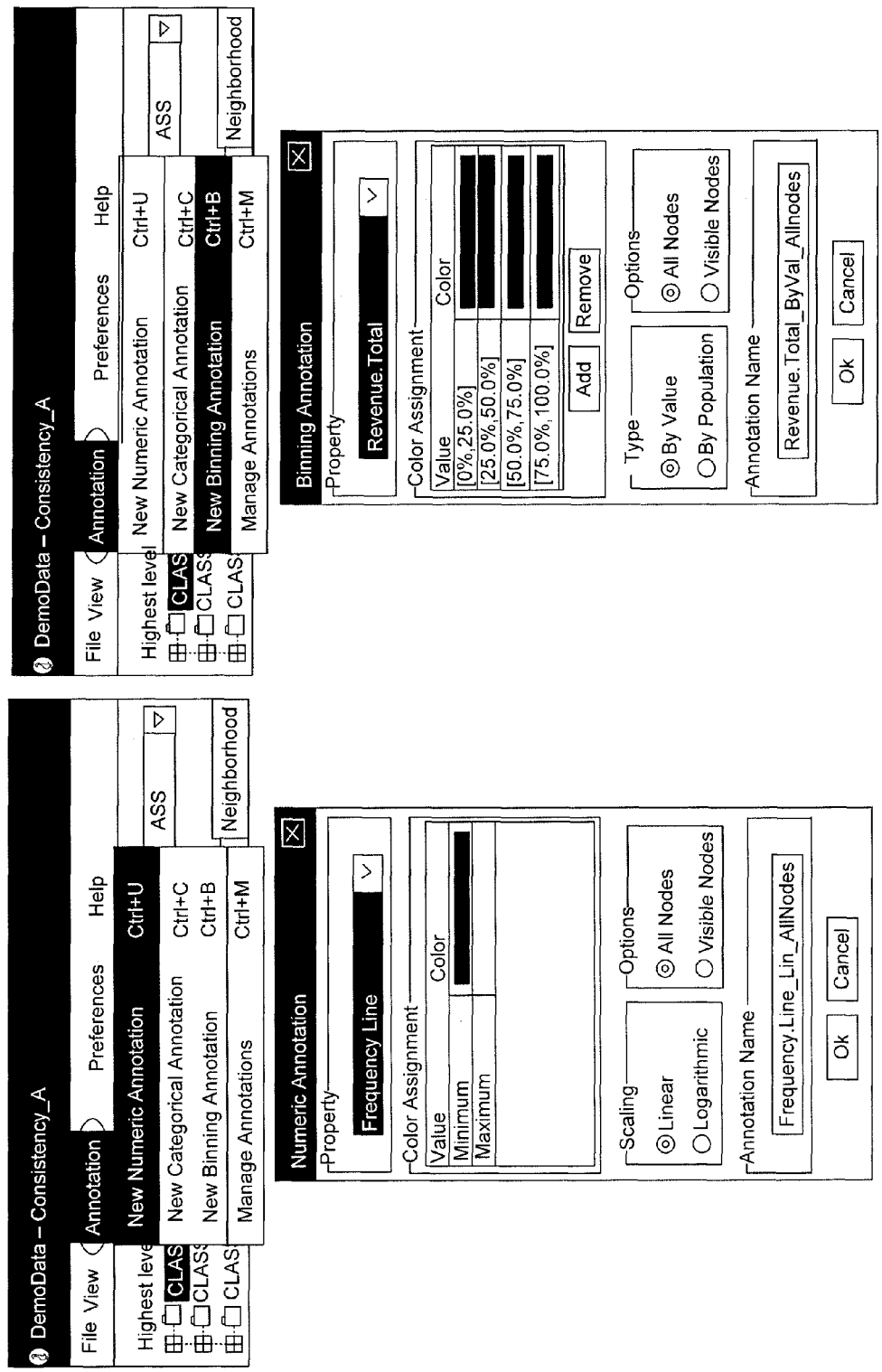
FIG. 40 is a screen shot showing product space browser functionality in the creation of annotations according to the invention.

FIG. 40 is a screen shot showing product space browser functionality in the creation of annotations. In FIG. 40, a user selects the Annotation button and a drop-down menu provides options. In the case of FIG. 40, the user selects a new numeric annotation and a panel appears. The user may alternately select a categorical or a binning annotation. Thus, while a new numeric annotation is shown on the left-hand panel of FIG. 40, the right-hand panel of FIG. 40 shows that the user has selected a new binning annotation. In this case, the properties for the binning annotation may be chosen by the user.

Step 2: Applying Annotations (FIGS. 41 and 42)

Figure 41:
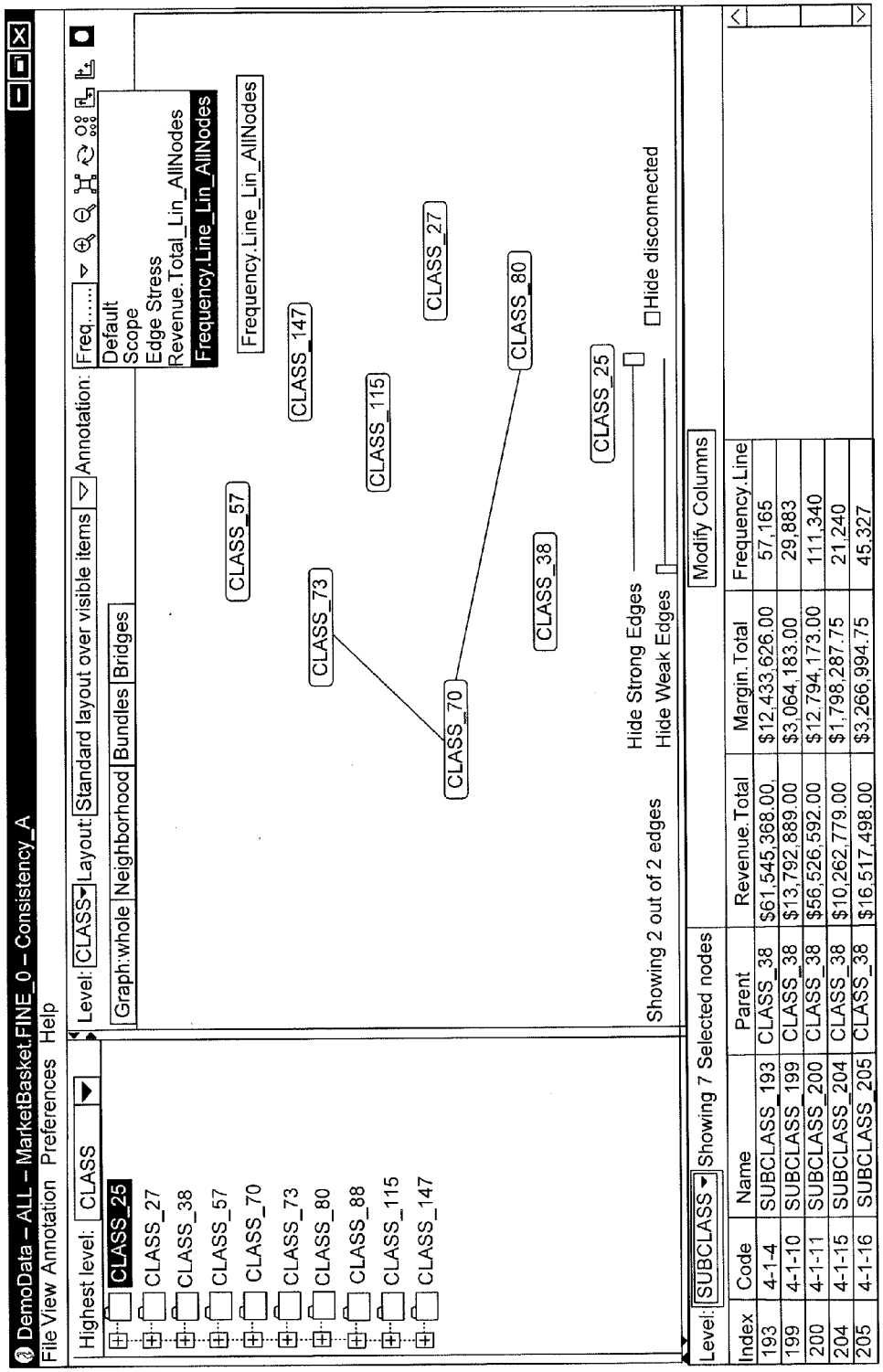
FIG. 41 is a screen shot showing product space browser functionality for the application of annotations according to the invention.

FIG. 41 is a screen shot showing product space browser functionality for the application of annotations. In FIG. 41, the user has selected a level, layout, and annotation. The annotation selected is shown as Frequency.Lin_AllNodes. An appropriate display is shown.

Figure 42:
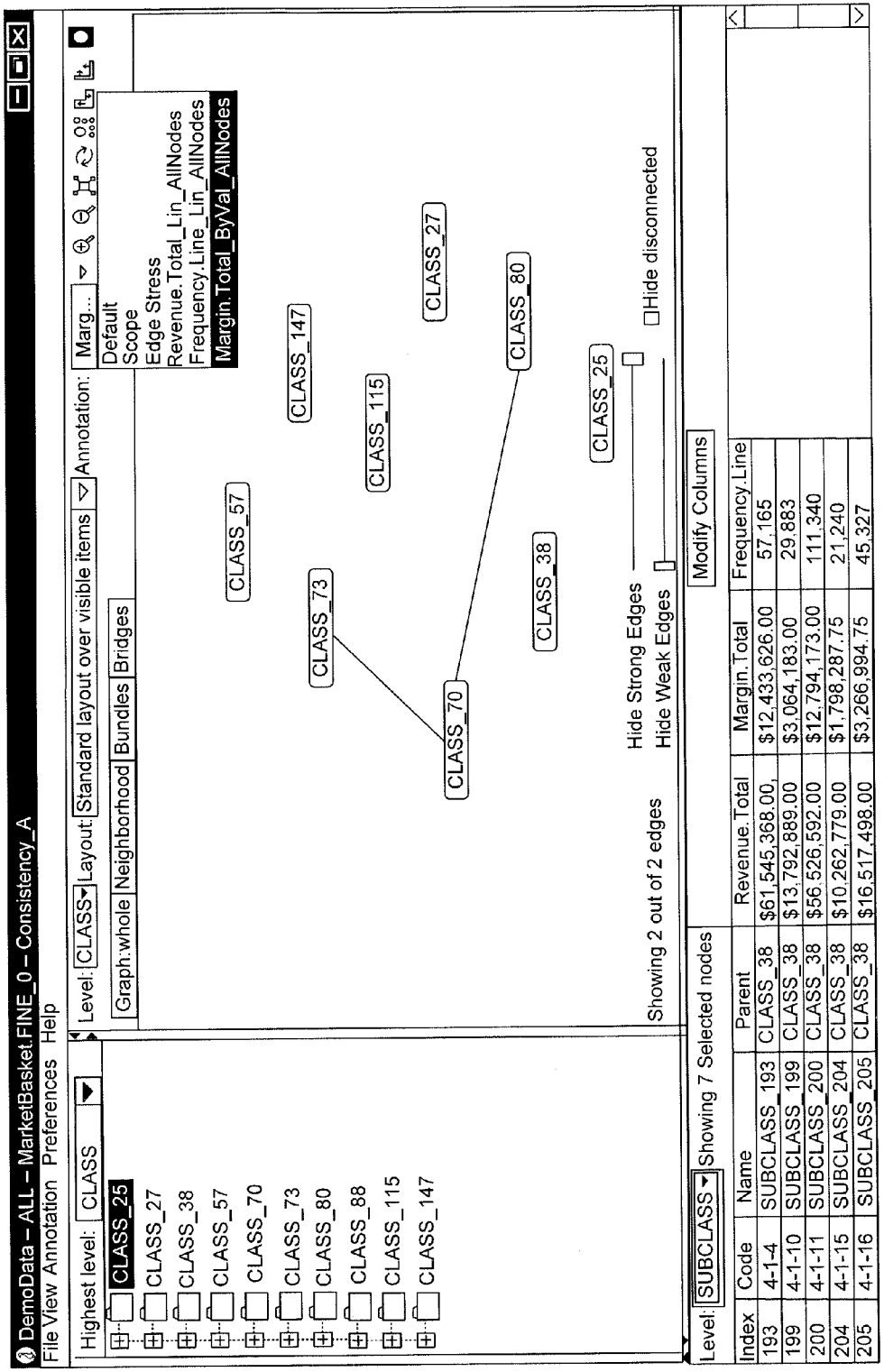
FIG. 42 is a screen shot showing product space browser functionality in connection with the application of annotations according to the invention.

FIG. 42 is a screen shot showing product space browser functionality in connection with the application of annotations. As with FIG. 41, FIG. 42 shows a drop-down annotation menu. In this case, the user has selected Margin.Total_ByVal_AllNodes.

Preferences

Figure 43:
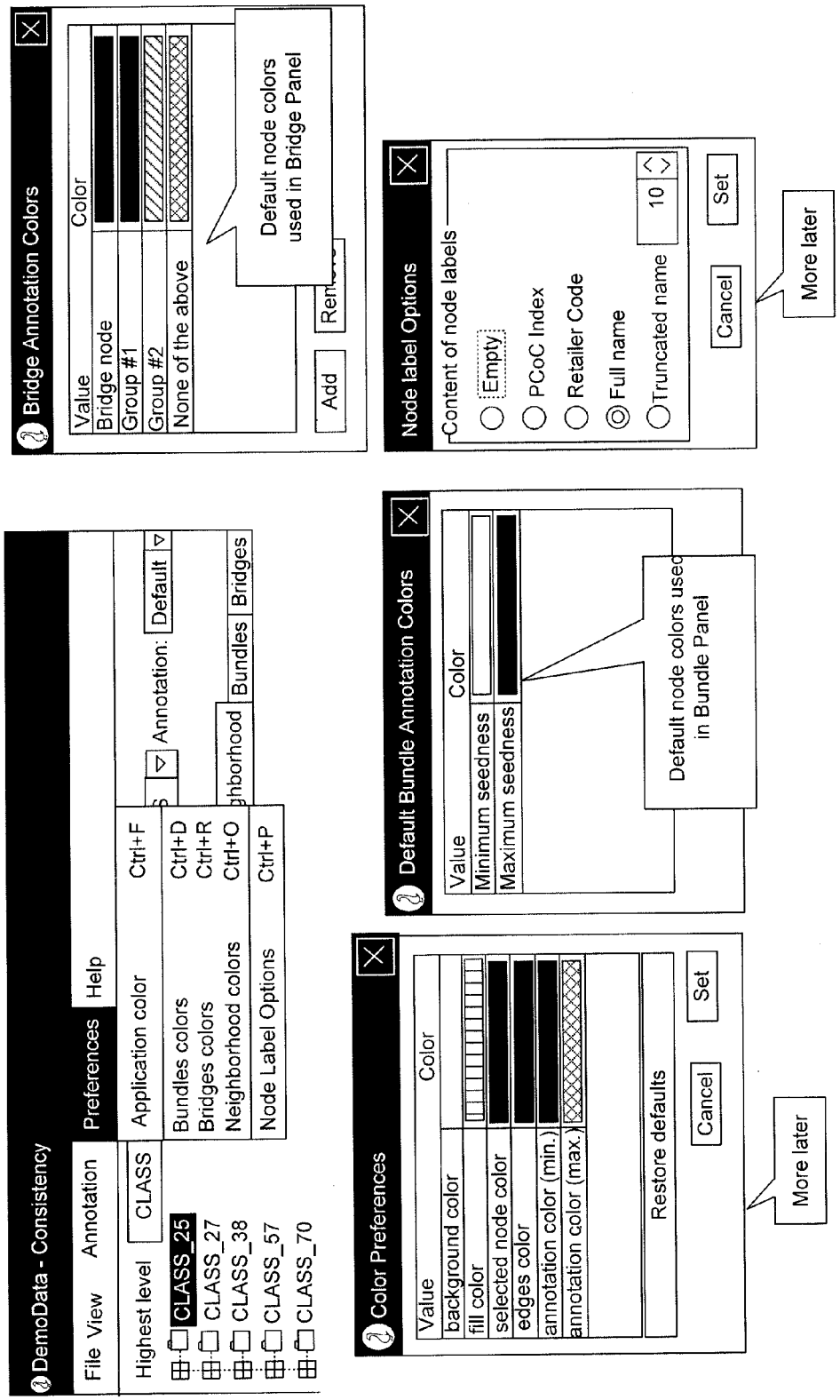
FIG. 43 is a series of screen shots showing product space browser functionality in connection with user preferences according to the invention.

Available Preferences (FIG. 43)

FIG. 43 is a series of screen shots showing product space browser functionality in connection with user preferences. In FIG. 43, a Preferences button shows a drop-down menu that provides the user with various preferences that can be selected. These preferences include application colors, bundle colors, bridge colors, neighborhood colors, and node label options.

Figure 44:
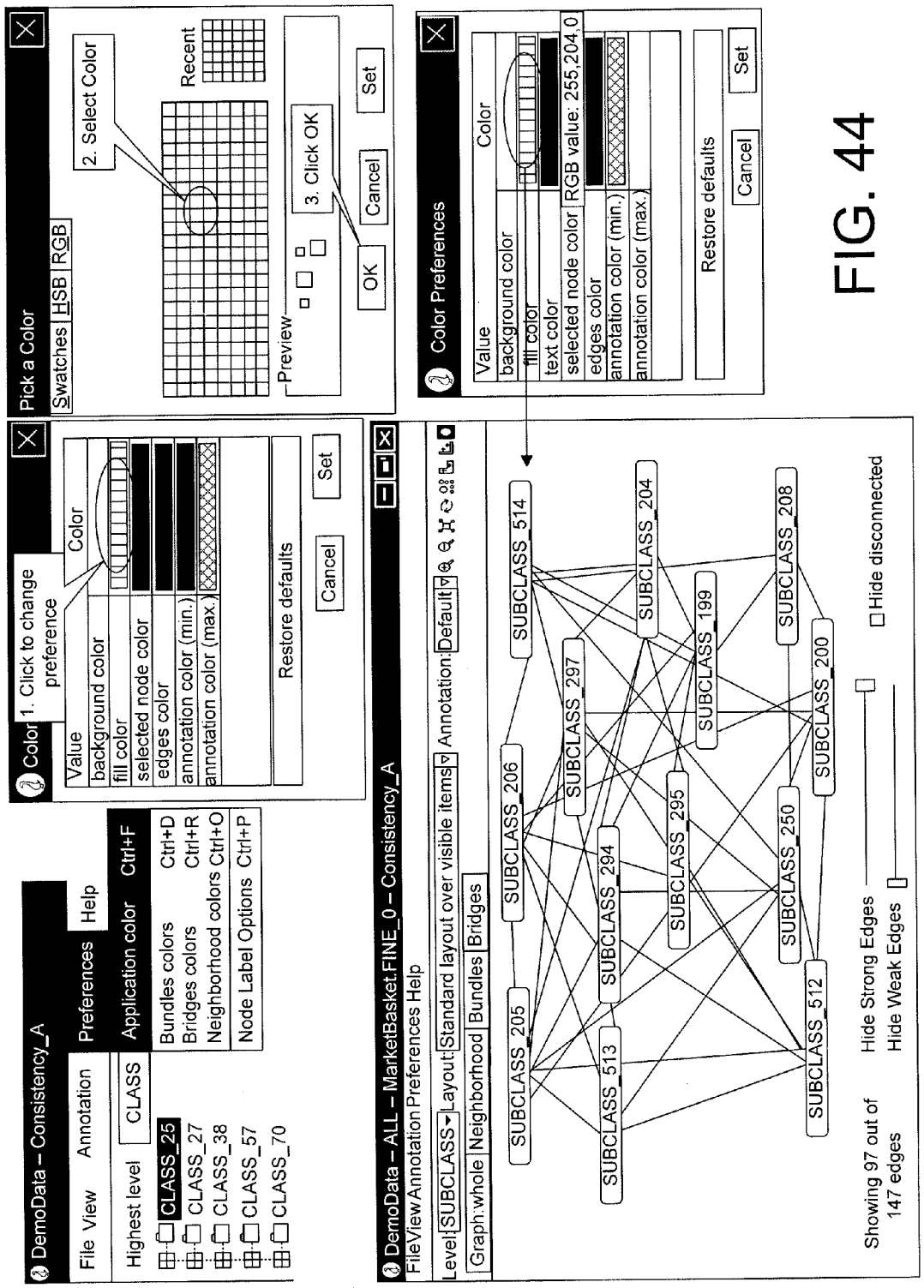
FIG. 44 is a series of screen shots showing product space browser functionality in connection with user color preferences according to the invention.

Color Preferences (FIG. 44)

FIG. 44 is a series of screen shots showing product space browser functionality in connection with user color preferences. As shown in FIG. 44, the user clicks to change a color preference and then selects a color. When the desired color is selected, the user clicks Okay and the color is then applied to the display.

Color Preferences are automatically saved upon exiting PSB, and automatically loaded on the next PSB start.

Color Preferences are saved into the file
<home-dir>\colorprefs.psb
On WinXP, <home-dir> is usually
C:\Documents and Settings\<your login name>.

If it is desired to revert back to the default colors, simply delete this file.

Figure 45:
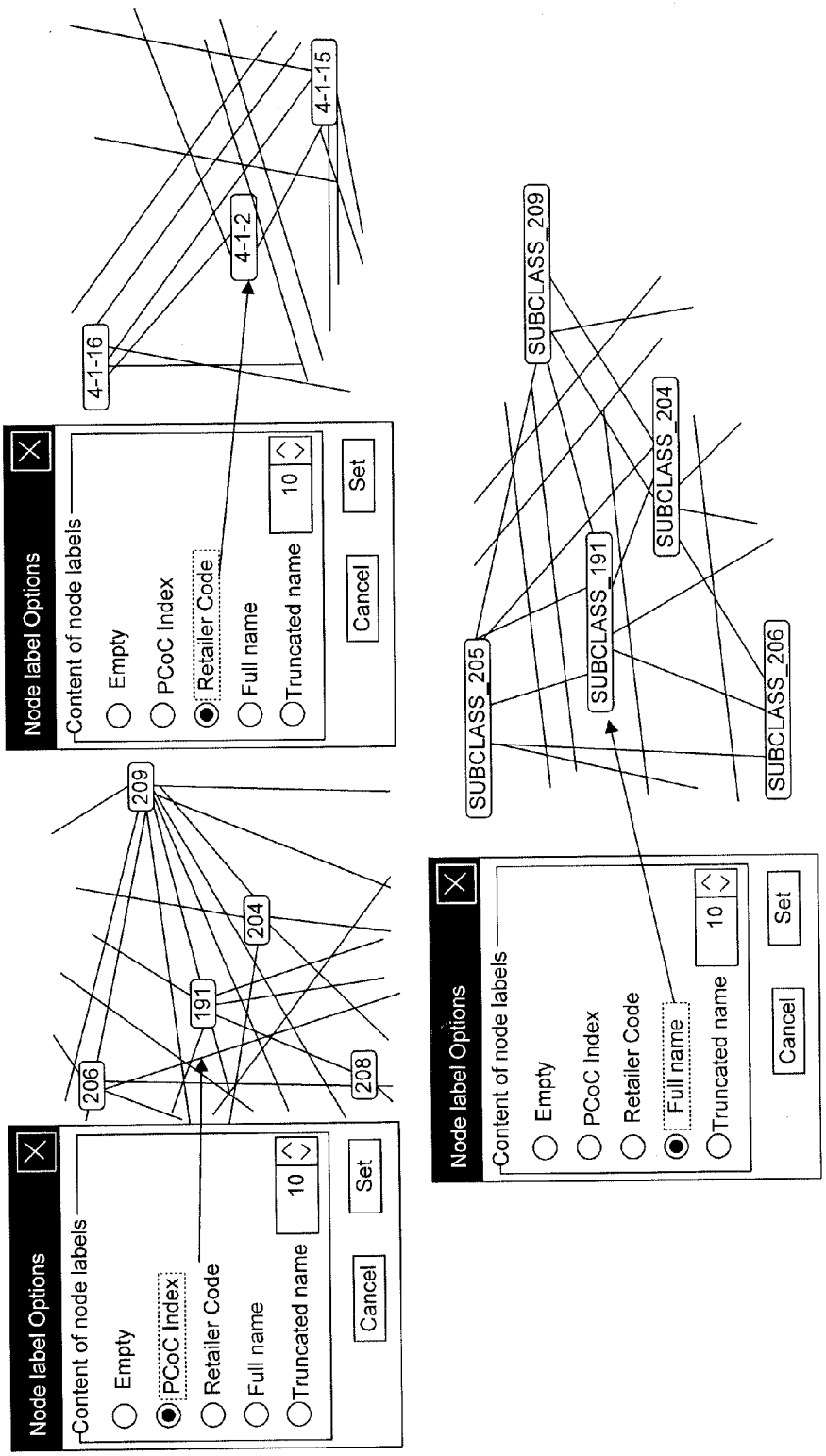
FIG. 45 is a screen shot showing product space browser functionality in connection with user node label preferences according to the invention.

Node Label Preferences (FIG. 45)

FIG. 45 is a screen shot showing product space browser functionality in connection with user node label preferences. In FIG. 45, the user has various options provided at the node label options menu. For example, the user can label by index as shown in a first panel on FIG. 45. The user may also select a retailer code or a full name. Other options include empty and truncated name.

Session Manager

Figure 46:
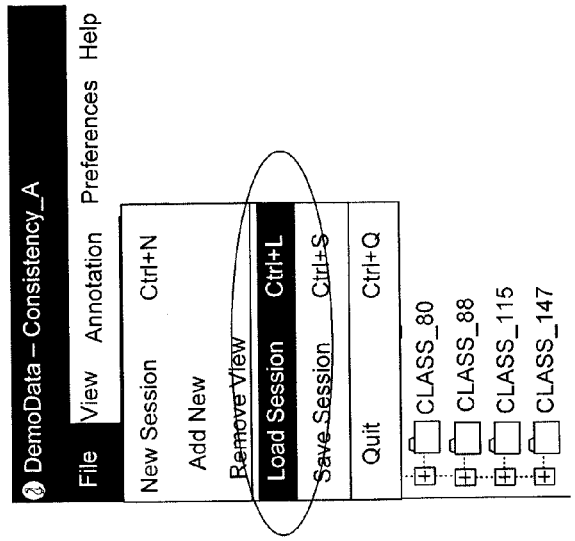
FIG. 46 is a screen shot showing product space browser functionality in connection with the session manager according to the invention.

What is a Session? (FIG. 46)

FIG. 46 is a screen shot showing product space browser functionality in connection with the session manager. In FIG. 46, the user has selected a drop-down menu from the File menu, and a load session option is provided. In this embodiment of the invention, the user works in sessions. The user can load a previous session or the user can save a current session for the future. In the preferred embodiment of the invention, a session can include any of the following: user name, session name, session create date, customization, context, consistency, and annotations created.

Figure 47:
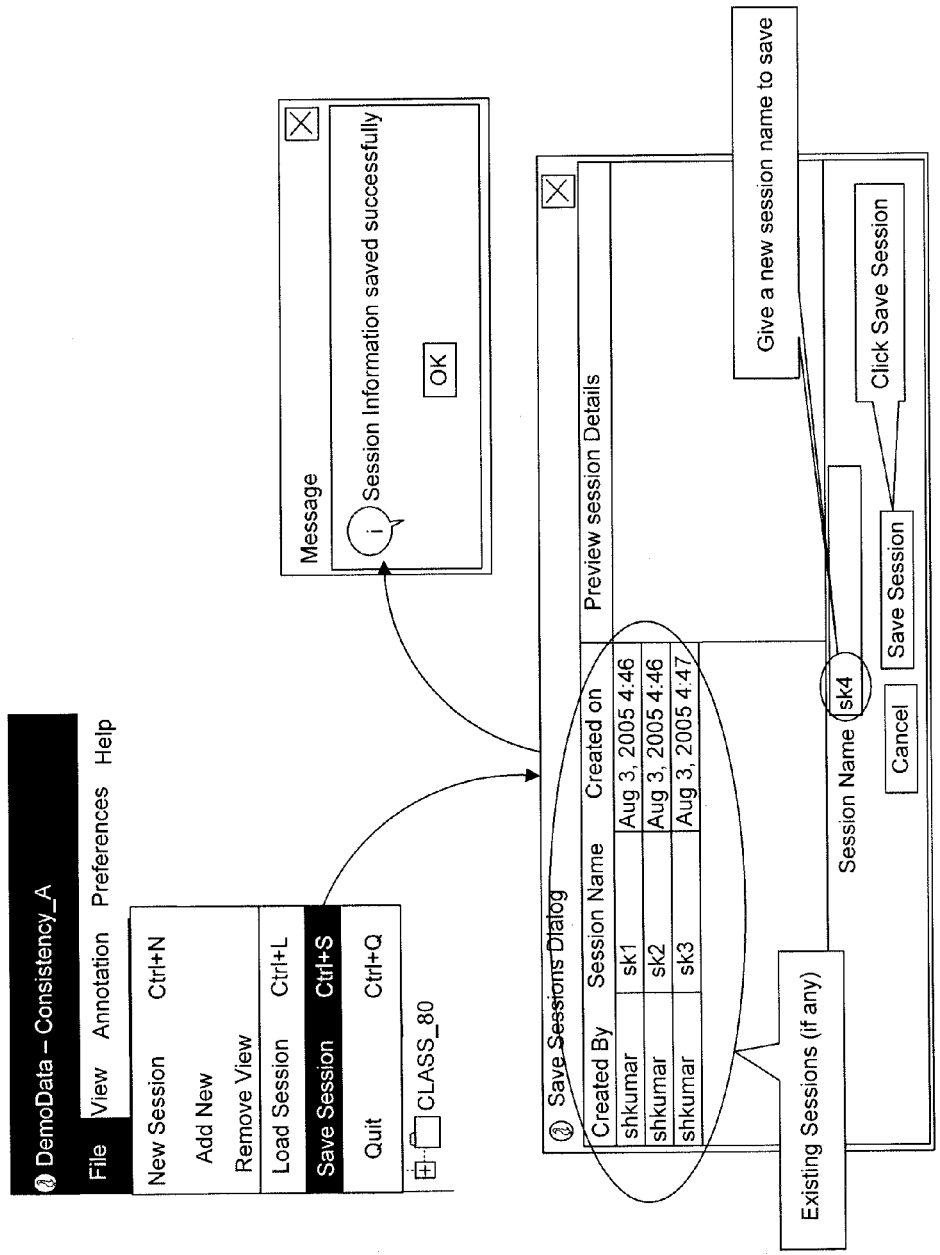
FIG. 47 is a series of screen shots showing product space browser functionality in connection with the saving of a session according to the invention.

Saving a Session (FIG. 47)

FIG. 47 is a series of screen shots showing product space browser functionality in connection with the saving of a session. In FIG. 47, a user selects Save Session from a drop-down menu. The Save Sessions dialog shows existing sessions, if any. The user may give a new session name to the session to be saved and then click on Save Session button. A message is provided confirming that the session information has been saved successfully.

Figure 48:
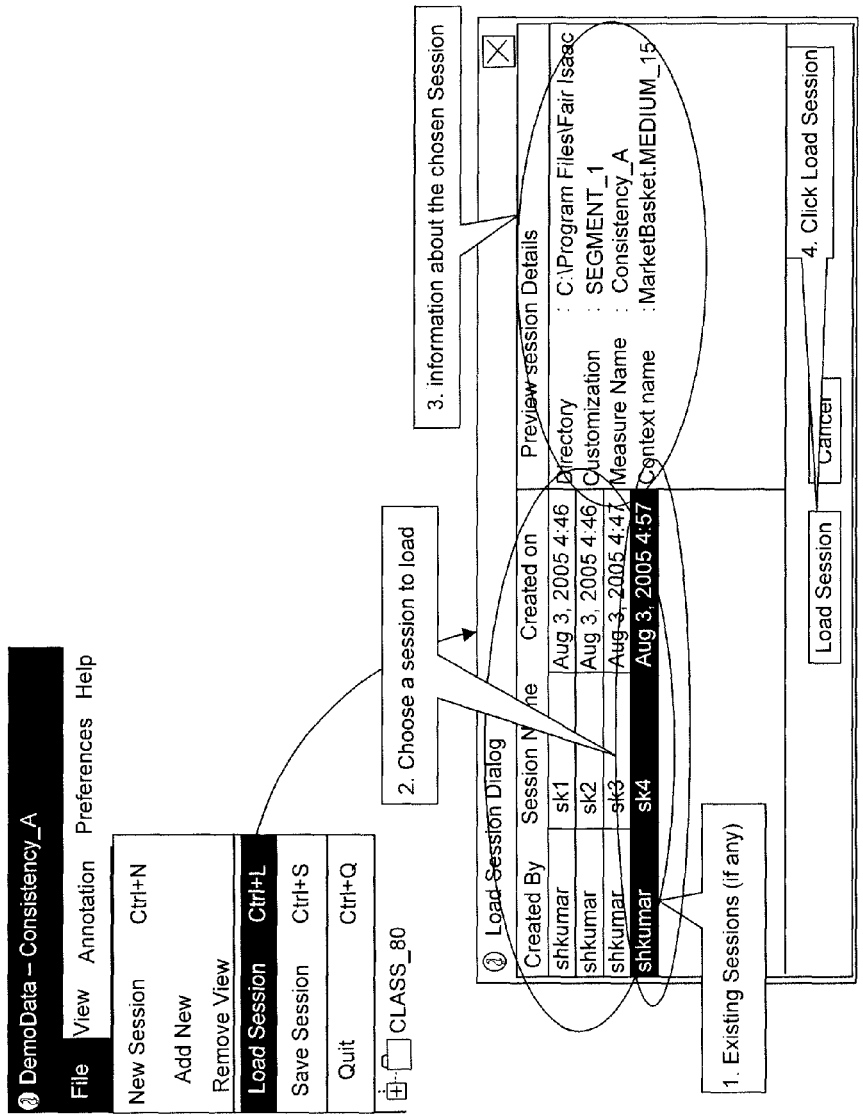
FIG. 48 provides a series of screen shots showing product space browser functionality in connection with the loading of a session according to the invention.

Loading a Session (FIG. 48)

FIG. 48 is a series of screen shots showing product space browser functionality in connection with the loading of a session. In FIG. 48, the user has selected the Load Session function of a drop-down menu. The user chooses a session to load from existing sessions, and information about the chosen session is displayed. The user can then click the Load Session button to load the session and proceed in connection with the above-identified product space browser functions.

Details of Where the Sessions are Saved

Sessions are stored under the folder:
<home-directory>\.psbSessions
On Windows XP:

<home-directory> = C:\Documents and Settings\<your login name>

One can REMOVE ALL SESSIONS by removing this file.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus for visualizing data, comprising:
    means for generating one or more product space graphs by applying a product affinity engine to retailer's transaction data; and
    means for rendering a graphical user interface (GUI) for effecting exploration and analysis of said product space graphs;
    wherein:
        the GUI comprises at least one panel selected from a group consisting of: Product, Property, and Graph panels;
        the Product panel comprises means for choosing a product from among a plurality of available levels, wherein said Product panel lists all products in a current level, and wherein a user is able to choose a level that the user is interested in to see a product list at that level; and
        the Property panel comprises means for providing a spreadsheet view of properties for the property panel, wherein columns are resized, columns are dragged and moved around in different positions, an entire table is sorted by one or two properties, and properties are seen for any level.

2. The apparatus of claim 1, said product space graph comprising an internal representation of co-purchase consistency relationships between all pairs of products, at various product resolutions, computed from a retailer's transaction data.

3. The apparatus of claim 1, said GUI comprising:
    means for discovering consistent relationships in massive amounts of purchase data, and for identifying product relationships based on purchase-behavior, both in market baskets and across time.

4. The apparatus of claim 1, said GUI comprising:
    means for using purchase data to identify opportunities for creating an efficient alignment of customer intent and store content.

5. The apparatus of claim 1, said GUI comprising:
    means for segmenting customers and products based on purchase behavior to create a differentiated customer experience; and
    means for generating recommendations tailored to each customer and each store.

6. The apparatus of claim 1, said GUI comprising:
    means for analyzing purchase career paths that lend themselves to generating accurate cross-sell and up-sell recommendations and targeted promotions.

7. The apparatus of claim 1, said GUI comprising:
    means for determining bridge products that can influence future purchase sequences and help move a customer's purchase career path from one category to another higher value category.

8. The apparatus of claim 1, said GUI comprising:
    means for generating in-the-field analyses of product purchase affinities that retailers can offer for sale to manufacturers and distributors as information products.

9. The apparatus of claim 1, said product space graph comprising:
    means for constraining the scope of a product relationship (Customization), defining the nature of a product relationship (Context), and quantifying the strength of the product relationship (Consistency).

10. The apparatus of claim 9, said Customization comprising any of:
    Customer customization comprising Segments and Value Tiers customization; Location customization comprising Stores and Regions customization; and
    Temporal customization comprising Week, month, quarter, and season customization.

11. The apparatus of claim 9, said Context comprising any of:
    a Single visit Market Basket Context; and
    a Multi-visit Market Basket Context.

12. The apparatus of claim 9, said Consistency comprising a degree to which two products are co-purchased relative to random.

13. The apparatus of claim 1, said GUI comprising:
    means for loading a Product Space.

14. The apparatus of claim 1, said Graph panel comprising:
    means for picking a level for which a graph is to present information, showing an active level of a current view.

15. The apparatus of claim 1, wherein graphs are projected onto a two-dimensional viewer in which a standard layout over all items determines a position of each visible node relative to a set of all (visible plus hidden) nodes.

16. The apparatus of claim 1, said Graph panel comprising:
    basic controls for allowing a user to zoom in, zoom out, zoom and pan to fit, re-compute layout, hide product and property panels, restore product and property panels, turn on or off a lens distortion feature, and create a snapshot.

17. The apparatus of claim 1, said Graph panel comprising:
    one or more structure panels for providing any of a graph: whole feature comprising a sub-panel showing an entire graph at a selected level; and graph: subgraph comprising a sub-panel showing subgraphs.

18. The apparatus of claim 17, said one or more structure panels comprising:
    means for showing a bundle sub-panel showing product bundles; and a bridges sub-panel showing bridge structures.

19. The apparatus of claim 1, said Product panel comprising:
    means for any of Single product Selection and a Multiple product Selection.

20. The apparatus of claim 1, said Property panel comprising:
    means for any of Single property Selection and a Multiple property Selection.

21. The apparatus of claim 1, said Graph panel comprising:
    one or more sliders to control edge display.

22. The apparatus of claim 21, said Neighborhood Panel comprising:

a Show Cross-Edges feature to display an entire neighborhood graph;
a first panel for displaying a neighborhood in which cross-edges are not selected; and
a second panel for displaying a neighborhood including all cross-edges.

23. The apparatus of claim 1, said Graph panel comprising:
means for any of showing/hiding connected nodes, showing properties of visible nodes, drilling down to finer product levels in any part of a product space from a coarser level to a finer level, linking panels, picking a product to see its neighborhood, and increasing the size of visible neighborhood.

24. The apparatus of claim 1, further comprising:
a Neighborhood Panel for effecting display of cross-connections among neighbors.

25. The apparatus of claim 1, further comprising:
a Bundle Panel comprising a product-based bundle navigator that allows a user to pick a product whose bundles the user wishes to see from a bundle table that lists available bundles to choose from, based on selection in a list of member nodes; wherein each bundle has any an ID, a seed node, a size, minimum and maximum seedness, and other properties that are used to sort the bundles.

26. The apparatus of claim 1, further comprising:
a Bridge Panel comprising a product-based bridge navigator;
wherein a product comprises any of a bridge product and a part of a group in a bridge structure; and
wherein each bridge is associated with any of a bridge ID, bridge product name, member groups, and minimum and maximum bridgeness value.

27. The apparatus of claim 1, further comprising:
an Annotation manager for providing functionality in connection with annotations; wherein a user can create or manage an annotation and can as well apply an annotation; and
wherein annotations comprise any of a numeric annotation having a continuous or numerical property, a categorical annotation having a categorical property, and a binning annotation for binning of numeric properties.

28. The method of claim 27, computing said product space graph from a retailer's transaction data, said product space graph comprising an internal representation of co-purchase consistency relationships between all pairs of products, at various product resolutions.

29. The method of claim 27, further comprising the step of:
discovering consistent relationships in massive amounts of purchase data, and for identifying product relationships based on purchase-behavior, both in market baskets and across time.

30. The method of claim 27, further comprising the step of:
using purchase data to identify opportunities for creating an efficient alignment of customer intent and store content.

31. The method of claim 27, further comprising the steps of:
segmenting customers and products based on purchase behavior to create a differentiated customer experience; and
generating recommendations tailored to each customer and each store.

32. The apparatus of claim 1, further comprising:
a session manager;
wherein a user can either of load a previous session and save a current session for the future;
wherein a session comprises any of user name, session name, session create date, customization, context, consistency, and annotations created.

33. The method of claim 1, further comprising the step of:
analyzing purchase career paths that lend themselves to generating accurate cross-sell and up-sell recommendations and targeted promotions.

34. The method of claim 1, further comprising the step of:
determining bridge products that can influence future purchase sequences and help move a customer's purchase career path from one category to another higher value category.

35. The method of claim 34, said Customization comprising any of:
Customer customization comprising Segments and Value Tiers customization;
Location customization comprising Stores and Regions customization; and
Temporal customization comprising Week, month, quarter, and season customization.

36. The method of claim 34, said Context comprising any of:
a Single visit Market Basket Context; and
a Multi-visit Market Basket Context.

37. The method of claim 34, said Consistency comprising a degree to which two products are co-purchased relative to random.

38. The method of claim 1, further comprising the step of:
generating in-the-field analyses of product purchase affinities that retailers can offer for sale to manufacturers and distributors as information products.

39. The method of claim 1, further comprising the step of:
constraining the scope of a product relationship (Customization), defining the nature of a product relationship (Context), and quantifying the strength of the product relationship (Consistency).

40. A method for visualizing data, comprising the steps of:
generating one or more product space graphs by applying a product affinity engine to retailer's transaction data; and
providing a graphical user interface (GUI) for effecting exploration and analysis of said product space graphs;
wherein:
the GUI comprises a Product panel or a Graph panel;
the Product panel allowing a user to choose a product from among a plurality of available levels, wherein said Product panel lists all products in a current level, and wherein a user is able to choose a level that the user is interested in to see a product list at that level; and
the Property panel providing a spreadsheet view of properties for the property panel, wherein columns are resized, columns are dragged and moved around in different positions, an entire table are sorted by one or two properties, and properties are seen for any level.

41. An article of manufacture comprising a non-transitory machine-accessible medium having instructions which, when executed, cause a machine to:
generate one or more product space graphs by applying a product affinity engine to retailer's transaction data; and
provide a graphical user interface (GUI) for effecting exploration and analysis of said product space graphs;
wherein:
the GUI comprises a Product panel and/or a Graph panel;
the Product panel allowing a user to choose a product from among a plurality of available levels, wherein said Product panel lists all products in a current level, and wherein a user is able to choose a level that the user is interested in to see a product list at that level; and the Property panel providing a spreadsheet view of properties for the property panel, wherein columns are resized, columns are dragged and moved around in different positions, an entire table is sorted by one or two properties, and properties are seen for any level.

* * * * *